US012761342B2

United States Patent
(12) United States Patent
Pakrooh et al.

(10) Patent No.: US 12,761,342 B2
(45) Date of Patent: Oct. 13, 2026

(54) FREQUENCY STITCHING FOR UWB RANGING AND SENSING

(71) Applicant: QUALCOMM Incorporated, San Diego, CA (US)

(72) Inventors: Pooria Pakrooh, San Marcos, CA (US); Alexandros Manolakos, Athens (GR); Varun Amar Reddy, San Diego, CA (US); Krishna Kiran Mukkavilli, San Diego, CA (US); Bin Tian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 248 days.

(21) Appl. No.: 18/713,928

(22) PCT Filed: Feb. 24, 2023

(86) PCT No.: PCT/US2023/063250
§ 371 (c)(1),
(2) Date: May 28, 2024

(87) PCT Pub. No.: WO2023/164634
PCT Pub. Date: Aug. 31, 2023

(65) Prior Publication Data

US 2025/0035770 A1 Jan. 30, 2025

(30) Foreign Application Priority Data

Feb. 28, 2022 (GR) .............................. 20220100181

(51) Int. Cl.
*G01S 13/76* (2006.01)
*G01S 13/87* (2006.01)
*H04B 1/7183* (2011.01)

(52) U.S. Cl.
CPC .......... *G01S 13/765* (2013.01); *G01S 13/876* (2013.01); *H04B 1/7183* (2013.01)

(58) Field of Classification Search
CPC ....... H04W 4/80; H04B 1/7183; G01S 13/765
(Continued)

(56) References Cited

U.S. PATENT DOCUMENTS 6,570,462 B2 * 5/2003 Edmonson ........... H03H 9/0042 455/121
7,233,800 B2 * 6/2007 Laroia ................... G01S 5/0226 370/332
(Continued)

FOREIGN PATENT DOCUMENTS

WO 2016209833 A1 12/2016

OTHER PUBLICATIONS

International Search Report and Written Opinion—PCT/US2023/063250—ISA/EPO—Jun. 19, 2023.
(Continued)

*Primary Examiner* — Michael W Justice
(74) *Attorney, Agent, or Firm* — Weaver Austin Villeneuve & Sampson LLP/QUALCOMM Incorporated

(57) ABSTRACT

In some implementations, a method may comprise determining capabilities of UWB initiator and responder devices related to at least one UWB session. The method may also comprise determining a gap duration based at least in part on the capabilities of the UWB initiator and responder devices for performing RF retuning during the at least one UWB session. The method may also comprise sending a configuration to the UWB initiator and/or responder devices, wherein the configuration is indicative of: a first period of time in the at least one UWB session during which a first portion of the UWB RF signals is transmitted using a first carrier frequency, a gap of at least the determined gap
(Continued)

duration following the first period of time, and a second period of time, following the gap, during which a second portion of the UWB RF signals is transmitted using a second carrier frequency.

30 Claims, 15 Drawing Sheets

(58) Field of Classification Search
USPC .................................... 342/42, 43; 455/456.1
See application file for complete search history.

(56) References Cited

U.S. PATENT DOCUMENTS

| | | | | |
|---|---|---|---|---|
| 7,768,445 | B2 * | 8/2010 | Inaba | G01S 7/023 342/112 |
| 8,000,687 | B2 * | 8/2011 | Laroia | H04B 17/27 455/414.3 |
| 8,472,971 | B2 * | 6/2013 | Rowe | H04W 64/00 342/464 |
| 8,805,297 | B2 * | 8/2014 | Hanevich | H04B 1/001 455/73 |
| 9,591,652 | B2 * | 3/2017 | Fujishiro | H04L 47/40 |
| 10,009,080 | B2 * | 6/2018 | Nagaraja | H04L 25/0224 |
| 10,461,826 | B2 * | 10/2019 | Nagaraja | H04B 7/063 |
| 10,721,053 | B2 * | 7/2020 | Axmon | H04W 56/005 |
| 10,848,213 | B2 * | 11/2020 | Nagaraja | H04B 7/06952 |
| 10,848,256 | B2 * | 11/2020 | Akkarakaran | H04W 56/004 |
| 10,939,481 | B1 * | 3/2021 | Liu | H04W 68/005 |
| 11,039,382 | B2 * | 6/2021 | Niu | H04B 1/713 |
| 11,044,771 | B2 * | 6/2021 | Chirikov | H04W 8/005 |
| 11,129,127 | B2 * | 9/2021 | Soriaga | H04W 64/00 |
| 11,133,910 | B2 * | 9/2021 | Huang | H04L 5/0092 |
| 11,166,238 | B2 * | 11/2021 | Jiang | H04W 24/10 |
| 11,202,183 | B2 * | 12/2021 | Rico Alvarino | H04W 72/23 |
| 11,272,529 | B2 * | 3/2022 | Park | H04W 76/27 |
| 11,632,754 | B2 * | 4/2023 | Rico Alvarino | H04B 7/0404 370/336 |
| 11,664,951 | B2 * | 5/2023 | Yiu | H04L 5/0007 370/329 |
| RE49,644 | E * | 9/2023 | Karabinis | G01D 21/00 340/10.3 |
| 12,464,595 | B2 * | 11/2025 | Oteri | H04W 52/0235 |
| 2002/0053953 | A1 * | 5/2002 | Edmonson | H03H 7/40 333/17.3 |
| 2006/0089154 | A1 * | 4/2006 | Laroia | H04B 17/327 455/456.2 |
| 2007/0232327 | A1 * | 10/2007 | Laroia | F01D 9/023 455/456.1 |
| 2009/0111482 | A1 * | 4/2009 | Rowe | H04W 64/00 455/456.1 |
| 2009/0278727 | A1 * | 11/2009 | Inaba | G01S 7/0235 342/112 |
| 2012/0021763 | A1 * | 1/2012 | Morrison | G01S 5/14 455/456.1 |
| 2012/0083278 | A1 * | 4/2012 | Kazmi | H04W 36/06 455/450 |
| 2012/0252487 | A1 * | 10/2012 | Siomina | H04W 24/10 455/456.1 |
| 2014/0105256 | A1 * | 4/2014 | Hanevich | H04B 1/001 375/219 |
| 2015/0323645 | A1 * | 11/2015 | Siomina | G01S 5/0205 455/456.1 |
| 2016/0212784 | A1 * | 7/2016 | Fujishiro | H04L 47/40 |
| 2016/0212785 | A1 * | 7/2016 | Fujishiro | H04L 47/40 |
| 2016/0381490 | A1 * | 12/2016 | Rico Alvarino | H04L 1/0068 370/330 |
| 2017/0238274 | A1 * | 8/2017 | Zhang | H04W 88/02 455/456.1 |
| 2018/0109302 | A1 * | 4/2018 | Nagaraja | H04W 24/02 |
| 2018/0145819 | A1 * | 5/2018 | Axmon | H04W 56/005 |
| 2018/0287677 | A1 * | 10/2018 | Nagaraja | H04B 7/06952 |
| 2018/0359790 | A1 * | 12/2018 | Ingale | H04W 72/51 |
| 2019/0327756 | A1 * | 10/2019 | Guan | H04L 5/0053 |
| 2020/0014523 | A1 * | 1/2020 | Huang | H04L 5/0092 |
| 2020/0067579 | A1 * | 2/2020 | Nagaraja | H04B 7/0486 |
| 2020/0092818 | A1 * | 3/2020 | Jiang | H04W 52/0261 |
| 2020/0153517 | A1 * | 5/2020 | Akkarakaran | H04W 56/0055 |
| 2020/0229124 | A1 * | 7/2020 | Soriaga | H04W 64/00 |
| 2020/0336973 | A1 * | 10/2020 | Niu | H04B 1/713 |
| 2020/0337100 | A1 * | 10/2020 | Chirikov | H04W 4/80 |
| 2021/0058111 | A1 * | 2/2021 | Liu | H04B 1/7143 |
| 2021/0068174 | A1 * | 3/2021 | Liu | H04W 76/10 |
| 2021/0160911 | A1 * | 5/2021 | Park | H04L 5/0094 |
| 2021/0173066 | A1 * | 6/2021 | Yoon | G01S 13/0209 |
| 2021/0250943 | A1 * | 8/2021 | Rico Alvarino | H04B 7/0404 |
| 2021/0359715 | A1 * | 11/2021 | Nabki | H04B 1/1615 |
| 2021/0367741 | A1 * | 11/2021 | Yiu | H04L 5/0007 |
| 2023/0188306 | A1 * | 6/2023 | Nory | H04L 5/001 370/330 |
| 2023/0309066 | A1 * | 9/2023 | Ganesan | G01S 13/765 |
| 2024/0196469 | A1 * | 6/2024 | Oteri | H04W 52/0235 |

OTHER PUBLICATIONS

Leong F., et al., "Sensing—Continued", Project: IEEE P802.15 Working Group for Wireless Personal Area Networks (WPANs), IEEE 802.15-22-0061-00-4ab, Jan. 20, 2022, 13 Pages.

* cited by examiner

FREQUENCY STITCHING FOR UWB RANGING AND SENSING

RELATED APPLICATIONS

This application is a National Phase entry of International Application No. PCT/US2023/063250, filed Feb. 24, 2023, entitled "FREQUENCY STITCHING FOR UWB RANGING AND SENSING" which claims the benefit of Greek Application No. 20220100181, filed Feb. 28, 2022, entitled "CARRIER GRID SPACING FOR UWB RANGING AND SENSING", which are assigned to the assignee hereof, and incorporated herein in their entirety by reference.

BACKGROUND

Field of Disclosure

The present disclosure relates generally to the fields of radiofrequency (RF)-based position determination (or positioning) of an electronic wireless device and RF sensing (or simply "sensing") by an electronic wireless device. More specifically, the present disclosure relates to ultra-wideband (UWB)-based positioning and sensing.

Description of Related Art

The positioning of devices can have a wide range of consumer, industrial, commercial, military, and other applications. RF sensing may have similar widespread applications. UWB (e.g., as defined in IEEE 802.15.4ab and/or other wireless specifications) offers a highly accurate, low-power solution for performing positioning of UWB-enabled devices (herein, "UWB devices") and/or sensing using UWB devices.

BRIEF SUMMARY

An example method of enabling frequency stitching in either or both of ultra-wideband (UWB) ranging or sensing, according to this disclosure, may comprise determining capabilities of a UWB initiator device and a UWB responder device related to at least one UWB session, wherein the capabilities comprise information indicative of a capability of each of the UWB initiator device and the UWB responder device for performing radio frequency (RF) retuning during the at least one UWB session, and the UWB responder device is configured to take measurements of UWB RF signals transmitted by the UWB initiator device during the at least one UWB session. The method also may comprise determining a gap duration based at least in part on the capability of each of the UWB initiator device and the UWB responder device for performing RF retuning during the at least one UWB session. The method also may comprise sending a configuration to the UWB initiator device, the UWB responder device, or both, wherein the configuration is indicative of: a first period of time in the at least one UWB session during which a first portion of the UWB RF signals is transmitted using a first carrier frequency, a gap following the first period of time and having a duration of at least the determined gap duration, and a second period of time in the at least one UWB session, following the gap, during which a second portion of the UWB RF signals is transmitted using a second carrier frequency.

An example device for enabling frequency stitching in either or both of ultra-wideband (UWB) ranging or sensing, according to this disclosure, may comprise a transceiver, a memory, one or more processors communicatively coupled with the transceiver and the memory, wherein the one or more processors are configured to determine capabilities of a UWB initiator device and a UWB responder device related to at least one UWB session, wherein: the capabilities comprise information indicative of a capability of each of the UWB initiator device and the UWB responder device for performing radio frequency (RF) retuning during the at least one UWB session, and the UWB responder device is configured to take measurements of UWB RF signals transmitted by the UWB initiator device during the at least one UWB session. The one or more processors further may be configured to determine a gap duration based at least in part on the capability of each of the UWB initiator device and the UWB responder device for performing RF retuning during the at least one UWB session. The one or more processors further may be configured to send a configuration, via the transceiver, to the UWB initiator device, the UWB responder device, or both, wherein the configuration is indicative of: a first period of time in the at least one UWB session during which a first portion of the UWB RF signals is transmitted using a first carrier frequency, a gap following the first period of time and having a duration of at least the determined gap duration, and a second period of time in the at least one UWB session, following the gap, during which a second portion of the UWB RF signals is transmitted using a second carrier frequency.

An example apparatus for enabling frequency stitching in either or both of ultra-wideband (UWB) ranging or sensing, according to this disclosure, may comprise means for determining capabilities of a UWB initiator device and a UWB responder device related to at least one UWB session, wherein: the capabilities comprise information indicative of a capability of each of the UWB initiator device and the UWB responder device for performing radio frequency (RF) retuning during the at least one UWB session, and the UWB responder device is configured to take measurements of UWB RF signals transmitted by the UWB initiator device during the at least one UWB session. The apparatus further may comprise means for determining a gap duration based at least in part on the capability of each of the UWB initiator device and the UWB responder device for performing RF retuning during the at least one UWB session. The apparatus further may comprise means for sending a configuration to the UWB initiator device, the UWB responder device, or both, wherein the configuration is indicative of: a first period of time in the at least one UWB session during which a first portion of the UWB RF signals is transmitted using a first carrier frequency, a gap following the first period of time and having a duration of at least the determined gap duration, and a second period of time in the at least one UWB session, following the gap, during which a second portion of the UWB RF signals is transmitted using a second carrier frequency.

According to this disclosure, an example non-transitory computer-readable medium stores instructions for enabling frequency stitching in either or both of ultra-wideband (UWB) ranging or sensing, the instructions comprising code for determining capabilities of a UWB initiator device and a UWB responder device related to at least one UWB session, wherein the capabilities comprise information indicative of a capability of each of the UWB initiator device and the UWB responder device for performing radio frequency (RF) retuning during the at least one UWB session, and the UWB responder device is configured to take measurements of UWB RF signals transmitted by the UWB initiator device during the at least one UWB session. The instructions further may comprise code for determining a gap duration based at least in part on the capability of each of the UWB initiator device and the UWB responder device for performing RF retuning during the at least one UWB session. The instructions further may comprise code for sending a configuration to the UWB initiator device, the UWB responder device, or both, wherein the configuration is indicative of: a first period of time in the at least one UWB session during which a first portion of the UWB RF signals is transmitted using a first carrier frequency, a gap following the first period of time and having a duration of at least the determined gap duration, and a second period of time in the at least one UWB session, following the gap, during which a second portion of the UWB RF signals is transmitted using a second carrier frequency.

This summary is neither intended to identify key or essential features of the claimed subject matter nor is it intended to be used in isolation to determine the scope of the claimed subject matter. The subject matter should be understood by reference to appropriate portions of the entire specification of this disclosure, any or all drawings, and each claim. The foregoing, together with other features and examples, will be described in more detail below in the following specification, claims, and accompanying drawings.

BRIEF DESCRIPTION OF THE DRAWINGS

The appended drawings are provided to complement the following description. It can be noted that the term "background" is included in the text of many of the appended drawings to provide context for the embodiments described herein. It does not necessarily follow, however, that such information should be considered prior art. Some information identified as background in the appended drawings may, in fact, comprise novel features used by one or more embodiments described herein.

Figure 1:
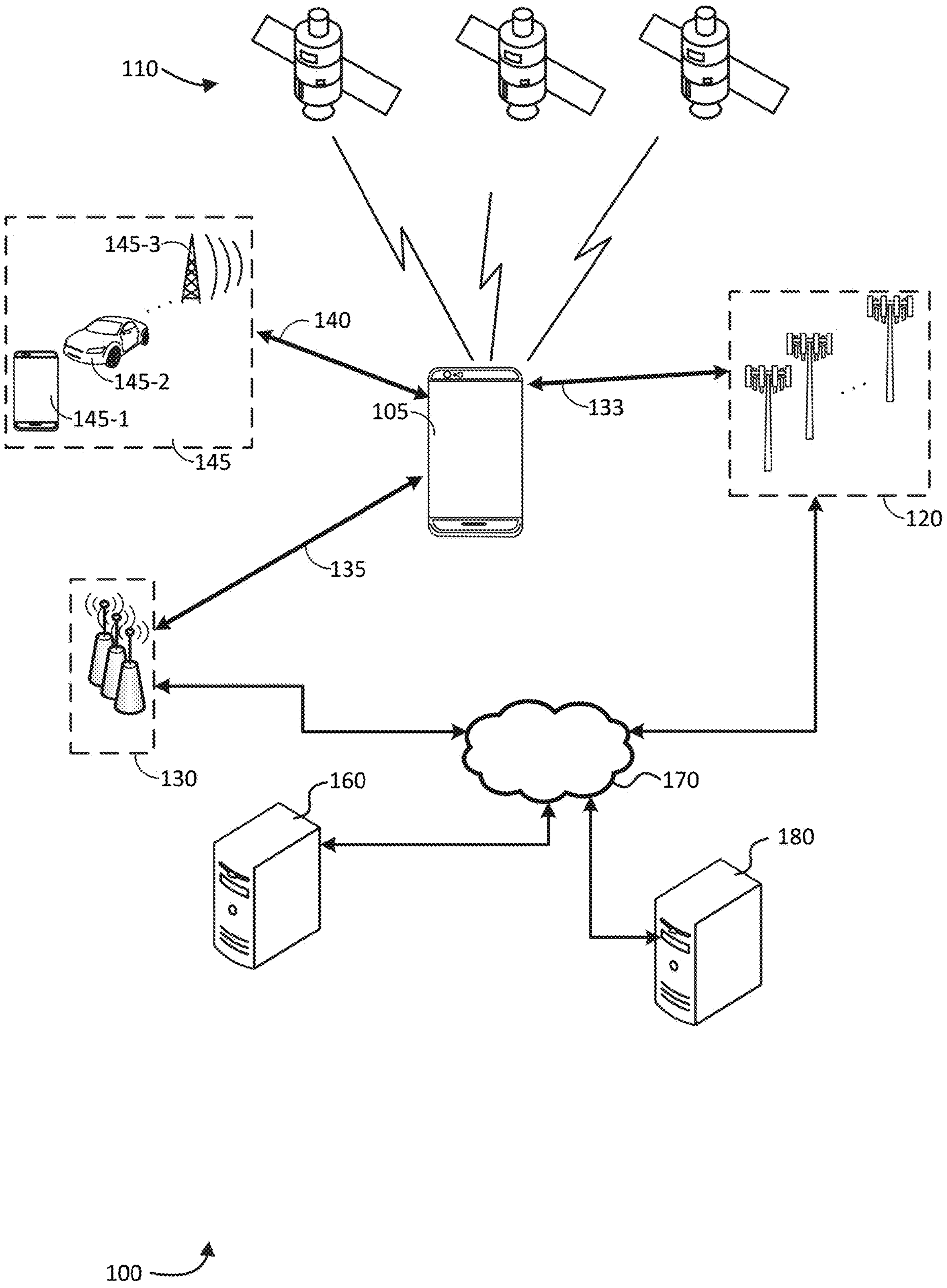
FIG. 1 is a diagram of a positioning system, according to an embodiment.

Like reference symbols in the various drawings indicate like elements, in accordance with certain example implementations. In addition, multiple instances of an element may be indicated by following a first number for the element with a letter or a hyphen and a second number. For example, multiple instances of an element 110 may be indicated as 110-1, 110-2, 110-3, etc. or as 110*a*, 110*b*, 110*c*, etc. When referring to such an element using only the first number, any instance of the element is to be understood (e.g., element 110 in the previous example would refer to elements 110-1, 110-2, and 110-3 or to elements 110*a*, 110*b*, and 110*c*).

DETAILED DESCRIPTION

The following description is directed to certain implementations for the purposes of describing innovative aspects of various embodiments. However, a person having ordinary skill in the art will readily recognize that the teachings herein can be applied in a multitude of different ways. The described implementations may be implemented in any device, system, or network that is capable of transmitting and receiving radio frequency (RF) signals according to any communication standard, such as any of the Institute of Electrical and Electronics Engineers (IEEE) 802.15.4 standards for ultra-wideband (UWB), IEEE 802.11 standards (including those identified as Wi-Fi® technologies), the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Rate Packet Data (HRPD), High Speed Packet Access (HSPA), High Speed Downlink Packet Access (HSDPA), High Speed Uplink Packet Access (HSUPA), Evolved High Speed Packet Access (HSPA+), Long Term Evolution (LTE), Advanced Mobile Phone System (AMPS), or other known signals that are used to communicate within a wireless, cellular or internet of things (IoT) network, such as a system utilizing 3G, 4G, 5G, 6G, or further implementations thereof, technology.

As used herein, an "RF signal" comprises an electromagnetic wave that transports information through the space between a transmitter (or transmitting device) and a receiver (or receiving device). As used herein, a transmitter may transmit a single "RF signal" or multiple "RF signals" to a receiver. However, the receiver may receive multiple "RF signals" corresponding to each transmitted RF signal due to the propagation characteristics of RF signals through multiple channels or paths.

Additionally, unless otherwise specified, references to "positioning reference signals," "reference signals for positioning," and the like may be used to refer to signals used for positioning of a mobile device, such as a UWB device. As described in more detail herein, such signals may comprise any of a variety of signal types. Additionally, unless otherwise specified, references to "sensing reference signals," "reference signals for sensing," and the like may be used to refer to signals used for RF sensing (also generically referred to herein as "sensing") as described herein. A signal used for RF sensing and/or positioning may be generally referred to herein as a reference signal (RS). As described in more detail herein, such signals may comprise any of a variety of signal types but may not necessarily be limited to signals solely used for RF sensing.

Further, unless otherwise specified, the term "positioning," "position determination," "location determination," "location estimation," and the like, as used herein may include absolute location determination, relative location determination, ranging, or a combination thereof. Such positioning may include and/or be based on timing, angular, phase, or power measurements, or a combination thereof (which may include RF sensing measurements) for the purpose of location or sensing services.

As previously noted, UWB-based positioning offers a highly accurate, low-power positioning solution relative to other RF-based positioning techniques for wireless electronic devices. The high accuracy and low power of UWB can also benefit RF sensing performed by UWB devices. Further, RF signals used for UWB positioning and sensing can be "stitched" together to effectively increase the bandwidth and accuracy of such positioning/sensing. However, because such RF signals are often transmitted using different UWB channels, a UWB device may need to re-tune its transceiver between the transmission/reception of such RF signals. Further, it may be desirable to help ensure transmission/reception at different frequencies occurs close in time, to help ensure accurate sensing/ranging in the presence of potential movement. Embodiments herein provide ways in which "gaps" between RF transmission/reception may be specified to allow this RF retuning of a UWB transceiver for frequency domain stitching.

Various aspects of this disclosure relate generally to UWB positioning and/or sensing. Some aspects more specifically relate to frequency domain stitching of multiple RF signals to effectively increase the bandwidth of UWB signals for positioning/sensing. In some examples, frequency domain stitching capabilities may be obtained from a UWB initiator device and a UWB responder device. A gap duration may then be determined based at least in part on these capabilities, and a configuration for transmitting/receiving first and second portions of RF signals for UWB sensing/positioning, in which a gap (e.g., duration of time) separates the first and second portions, may be provided to either or both of the UWB initiator device and UWB responder device. The RF signals may then be transmitted and received by the initiator and responder UWB devices in accordance with the configuration.

Particular aspects of the subject matter described in this disclosure can be implemented to realize one or more of the following potential advantages. In some examples, by including capability-based gaps in transmissions of RF signals for UWB positioning and/or sensing, the described techniques can be used to make more efficient use of bandwidth and power usage among devices participating in a UWB positioning session. These and other advantages will be apparent to a person of ordinary skill in the art in view of the embodiments described herein. Embodiments are described below, following a review of applicable technology.

FIG. 1 is a simplified illustration of a wireless system capable of communication, positioning, and sensing, referred to herein as a "communication/positioning/sensing system" 100 in which a mobile device 105, network function server 160, and/or other components of the communication/positioning/sensing system 100 can use the techniques provided herein for UWB-based ranging for a mobile device 105, according to an embodiment. The techniques described herein may be implemented by one or more components of the communication/positioning/sensing system 100. The communication/positioning/sensing system 100 can include a mobile device 105; one or more satellites 110 (also referred to as space vehicles (SVs)) for a Global Navigation Satellite System (GNSS) such as the Global Positioning System (GPS), GLONASS, Galileo or Beidou; base stations 120; access points (APs) 130; network function server 160; network 170; and external client 180. Generally put, the communication/positioning/sensing system 100 may be capable of enabling communication between the mobile device 105 and other devices, positioning of the mobile device 105 and/or other devices, performing RF sensing by the mobile device 105 and/or other devices, or a combination thereof. For example, the communication/positioning/sensing system 100 can estimate the location of the mobile device 105 based on RF signals received by and/or sent from the mobile device 105 and known locations of other components (e.g., GNSS satellites 110, base stations 120, APs 130) transmitting and/or receiving the RF signals. Additionally or alternatively, wireless devices such as the mobile device 105, base stations 120, and satellites 110 (and/or other NTN platforms, which may be implemented on airplanes, drones, balloons, etc.) can be utilized to perform positioning (e.g., of one or more wireless devices) and/or perform RF sensing (e.g., of one or more objects by using RF signals transmitted by one or more wireless devices).

It should be noted that FIG. 1 provides only a generalized illustration of various components, any or all of which may be utilized as appropriate, and each of which may be duplicated as necessary. Specifically, although only one mobile device 105 is illustrated, it will be understood that many mobile devices (e.g., hundreds, thousands, millions, etc.) may utilize the communication/positioning/sensing system 100. Similarly, the communication/positioning/sensing system 100 may include a larger or smaller number of base stations 120 and/or APs 130 than illustrated in FIG. 1. The illustrated connections that connect the various components in the communication/positioning/sensing system 100 comprise data and signaling connections which may include additional (intermediary) components, direct or indirect physical and/or wireless connections, and/or additional networks. Furthermore, components may be rearranged, combined, separated, substituted, and/or omitted, depending on desired functionality. In some embodiments, for example, the external client 180 may be directly connected to network function server 160. A person of ordinary skill in the art will recognize many modifications to the components illustrated.

Depending on desired functionality, the network 170 may comprise any of a variety of wireless and/or wireline networks. The network 170 can, for example, comprise any combination of public and/or private networks, local and/or wide-area networks, and the like. Furthermore, the network 170 may utilize one or more wired and/or wireless communication technologies. In some embodiments, the network 170 may comprise a cellular or another mobile network, a wireless local area network (WLAN), a wireless wide-area network (WWAN), and/or the Internet, for example. Examples of network 170 include a Long-Term Evolution (LTE) wireless network, a Fifth Generation (5G) wireless network (also referred to as New Radio (NR) wireless network or 5G NR wireless network), a Wi-Fi WLAN, and the Internet. LTE, 5G, and NR are wireless technologies defined, or being defined, by the 3rd Generation Partnership Project (3GPP). Network 170 may also include more than one network and/or more than one type of network. A mobile device of a cellular network (e.g., LTE and/or NR) also may be referred to as a User Equipment (UE).

The base stations 120 and access points (APs) 130 may be communicatively coupled to the network 170. In some embodiments, the base station 120*s* may be owned, maintained, and/or operated by a cellular network provider, and may employ any of a variety of wireless technologies, as described herein below. Depending on the technology of the network 170, a base station 120 may comprise a node B, an Evolved Node B (eNodeB or eNB), a base transceiver station (BTS), a radio base station (RBS), an NR NodeB (gNB), a Next Generation eNB (ng-eNB), or the like. A base station 120 that is a gNB or ng-eNB may be part of a Next Generation Radio Access Network (NG-RAN) which may connect to a 5G Core Network (5GC) in the case that Network 170 is a 5G network. The functionality performed by a base station 120 in earlier-generation networks (e.g., 3G and 4G) may be separated into different functional components (e.g., radio units (RUS), distributed units (DUs), and central units (CUs)) and layers (e.g., L1/L2/L3) in view Open Radio Access Networks (O-RAN) and/or Virtualized Radio Access Network (V-RAN or vRAN) in 5G or later networks, which may be executed on different devices at different locations connected, for example, via fronthaul, midhaul, and backhaul connections. As referred to herein, a "base station" (or ng-eNB, gNB, etc.) may include any or all of these functional components. An AP 130 may comprise a Wi-Fi AP or a Bluetooth® AP or an AP having cellular capabilities (e.g., 4G LTE and/or 5G NR), for example. Thus, mobile device 105 can send and receive information with network-connected devices, such as network function server 160, by accessing the network 170 via a base station 120 using a first communication link 133. Additionally or alternatively, because APs 130 also may be communicatively coupled with the network 170, mobile device 105 may communicate with network-connected and Internet-connected devices, including network function server 160, using a second communication link 135, or via one or more other mobile devices 145.

As used herein, the term "base station" may generically refer to a single physical transmission point, or multiple co-located physical transmission points, which may be located at a base station 120. A Transmission Reception Point (TRP) (also known as transmit/receive point) corresponds to this type of transmission point, and the term "TRP" may be used interchangeably herein with the terms "gNB," "ng-eNB," and "base station." In some cases, a base station 120 may comprise multiple TRPs—e.g. with each TRP associated with a different antenna or a different antenna array for the base station 120. As used herein, the transmission functionality of a TRP may be performed with a transmission point (TP), and/or the reception functionality of a TRP may be performed by a reception point (RP), which may be physically separate or distinct from a TP. That said, a TRP may comprise both a TP and an RP. Physical transmission points may comprise an array of antennas of a base station 120 (e.g., as in a Multiple Input-Multiple Output (MIMO) system and/or where the base station employs beamforming). The term "base station" may additionally refer to multiple non-co-located physical transmission points, the physical transmission points may be a Distributed Antenna System (DAS) (a network of spatially separated antennas connected to a common source via a transport medium) or a Remote Radio Head (RRH) (a remote base station connected to a serving base station).

As used herein, the term "cell" may generically refer to a logical communication entity used for communication with a base station 120, and may be associated with an identifier for distinguishing neighboring cells (e.g., a Physical Cell Identifier (PCID), a Virtual Cell Identifier (VCID)) operating via the same or a different carrier. In some examples, a carrier may support multiple cells, and different cells may be configured according to different protocol types (e.g., Machine-Type Communication (MTC), Narrowband Internet-of-Things (NB-IoT), Enhanced Mobile Broadband (eMBB), or others) that may provide access for different types of devices. In some cases, the term "cell" may refer to a portion of a geographic coverage area (e.g., a sector) over which the logical entity operates.

The network function server 160 may comprise one or more servers and/or other computing devices configured to provide a network-managed and/or network-assisted function, such as operating as a location server and/or sensing server. A location server, for example, may determine an estimated location of mobile device 105 and/or provide data (e.g., "assistance data") to mobile device 105 to facilitate location measurement and/or location determination by mobile device 105. According to some embodiments, a location server may comprise a Home Secure User Plane Location (SUPL) Location Platform (H-SLP), which may support the SUPL user plane (UP) location solution defined by the Open Mobile Alliance (OMA) and may support location services for mobile device 105 based on subscription information for mobile device 105 stored in the location server. In some embodiments, the location server may comprise, a Discovered SLP (D-SLP) or an Emergency SLP (E-SLP). The location server may also comprise an Enhanced Serving Mobile Location Center (E-SMLC) that supports the location of mobile device 105 using a control plane (CP) location solution for LTE radio access by mobile device 105. The location server may further comprise a Location Management Function (LMF) that supports the location of mobile device 105 using a control plane (CP) location solution for NR or LTE radio access by mobile device 105.

Similarly, the network function server 160, may function as a sensing server. A sensing server can be used to coordinate and/or assist in the coordination of sensing of one or more objects (also referred to herein as "targets") by one or more wireless devices in the communication/positioning/sensing system 100. This can include the mobile device 105, base stations 120, APs 130, other mobile devices 145, satellites 110, or any combination thereof. Wireless devices capable of performing RF sensing may be referred to herein as "sensing nodes." To perform RF sensing, a sensing server may coordinate sensing sessions in which one or more RF sensing nodes may perform RF sensing by transmitting RF signals (e.g., reference signals (RSs)), and measuring reflected signals, or "echoes," comprising reflections of the transmitted RF signals off of one or more objects/targets. Reflected signals and object/target detection may be determined, for example, from channel state information (CSI) received at a receiving device. Sensing may comprise (i) monostatic sensing using a single device as a transmitter (of RF signals) and receiver (of reflected signals); (ii) bistatic sensing using a first device as a transmitter and a second device as a receiver; or (iii) multi-static sensing using a plurality of transmitters and/or a plurality of receivers. To facilitate sensing (e.g., in a sensing session among one or more sensing nodes), a sensing server may provide data (e.g., "assistance data") to the sensing nodes to facilitate RS transmission and/or measurement, object/target detection, or any combination thereof. Such data may include an RS configuration indicating which resources (e.g., time and/or frequency resources) may be used (e.g., in a sensing session) to transmit RS for RF sensing. According to some embodiments, a sensing server may comprise a Sensing Management Function (SMF). In a CP location solution, signaling to control and manage the location of mobile device 105 may be exchanged between elements of network 170 and with mobile device 105 using existing network interfaces and protocols and as signaling from the perspective of network 170. In a UP location solution, signaling to control and manage the location of mobile device 105 may be exchanged between network function server 160 and mobile device 105 as data (e.g. data transported using the Internet Protocol (IP) and/or Transmission Control Protocol (TCP)) from the perspective of network 170.

As previously noted (and discussed in more detail below), the estimated location of mobile device 105 may be based on measurements of RF signals sent from and/or received by mobile device 105. In particular, these measurements can provide information regarding the relative distance and/or angle of the mobile device 105 from one or more components in the communication/positioning/sensing system 100 (e.g., GNSS satellites 110, APs 130, base stations 120). The estimated location of the mobile device 105 can be estimated geometrically (e.g., using multiangulation and/or multilateration), based on the distance and/or angle measurements, along with the known position of the one or more components.

Although terrestrial components such as APs 130 and base stations 120 may be fixed, embodiments are not so limited. Mobile components may be used. For example, in some embodiments, the location of the mobile device 105 may be estimated at least in part based on measurements of RF signals 140 communicated between the mobile device 105 and one or more other mobile devices 145, which may be mobile or fixed. As illustrated, other mobile devices may include, for example, a mobile phone 145-1, vehicle 145-2, static communication/positioning device 145-3, or another static and/or mobile device capable of providing wireless signals used for positioning the mobile device 105, or a combination thereof. Wireless signals from mobile devices 145 used for positioning of the mobile device 105 may comprise RF signals using, for example, Bluetooth® (including Bluetooth Low Energy (BLE)), IEEE 802.11x (e.g., Wi-Fi®), UWB, IEEE 802.15x, or a combination thereof. Mobile devices 145 may additionally or alternatively use non-RF wireless signals for positioning of the mobile device 105, such as infrared signals or other optical technologies.

Mobile devices 145 may comprise UEs communicatively coupled with a cellular or another mobile network (e.g., network 170). When one or more other mobile devices 145 comprising UEs are used in the position determination of a particular mobile device 105, the mobile device 105 for which the position is to be determined may be referred to as the "target UE," and each of the other mobile devices 145 used may be referred to as an "anchor UE." For position determination of a target UE, the respective positions of the one or more anchor UEs may be known and/or jointly determined with the target UE. Direct communication between the one or more other mobile devices 145 and mobile device 105 may comprise sidelink and/or similar Device-to-Device (D2D) communication technologies. Sidelink, which is defined by 3GPP, is a form of D2D communication under the cellular-based LTE and NR standards. As described hereafter, UWB may be one such technology by which the positioning of a target device (e.g., mobile device 105) may be facilitated using measurements from one or more anchor devices (e.g., mobile devices 145). Measurements of distance between the target device and one or more anchor devices may be referred to herein as "ranging."

According to some embodiments, such as when the mobile device 105 comprises and/or is incorporated into a vehicle, a form of D2D communication used by the mobile device 105 may comprise vehicle-to-everything (V2X) communication. V2X is a communication standard for vehicles and related entities to exchange information regarding a traffic environment. V2X can include vehicle-to-vehicle (V2V) communication between V2X-capable vehicles, vehicle-to-infrastructure (V2I) communication between the vehicle and infrastructure-based devices (commonly termed roadside units (RSUs)), vehicle-to-person (V2P) communication between vehicles and nearby people (pedestrians, cyclists, and other road users), and the like. Further, V2X can use any of a variety of wireless RF communication technologies. Cellular V2X (CV2X), for example, is a form of V2X that uses cellular-based communication such as LTE (4G), NR (5G) and/or other cellular technologies in a direct-communication mode as defined by 3GPP. The mobile device 105 illustrated in FIG. 1 may correspond to a component or device on a vehicle, RSU, or other V2X entity that is used to communicate V2X messages. In embodiments in which V2X is used, the static communication/positioning device 145-3 (which may correspond with an RSU) and/or the vehicle 145-2, therefore, may communicate with the mobile device 105 and may be used to determine the position of the mobile device 105 using techniques similar to those used by base stations 120 and/or APs 130 (e.g., using multiangulation and/or multilateration). It can be further noted that mobile devices 145 (which may include V2X devices), base stations 120, and/or APs 130 may be used together (e.g., in a WWAN positioning solution) to determine the position of the mobile device 105, according to some embodiments.

An estimated location of mobile device 105 can be used in a variety of applications—e.g. to assist direction finding or navigation for a user of mobile device 105 or to assist another user (e.g. associated with external client 180) to locate mobile device 105. A "location" is also referred to herein as a "location estimate", "estimated location", "location", "position", "position estimate", "position fix", "estimated position", "location fix" or "fix". The process of determining a location may be referred to as "positioning," "position determination," "location determination," or the like. A location of mobile device 105 may comprise an absolute location of mobile device 105 (e.g. a latitude and longitude and possibly altitude) or a relative location of mobile device 105 (e.g. a location expressed as distances north or south, east or west and possibly above or below some other known fixed location (including, e.g., the location of a base station 120 or AP 130) or some other location such as a location for mobile device 105 at some known previous time, or a location of a mobile device 145 (e.g., another UE) at some known previous time). A location may be specified as a geodetic location comprising coordinates which may be absolute (e.g. latitude, longitude and optionally altitude), relative (e.g. relative to some known absolute location) or local (e.g. X, Y and optionally Z coordinates according to a coordinate system defined relative to a local area such a factory, warehouse, college campus, shopping mall, sports stadium, or convention center). A location may instead be a civic location and may then comprise one or more of a street address (e.g. including names or labels for a country, state, county, city, road and/or street, and/or a road or street number), and/or a label or name for a place, building, portion of a building, floor of a building, and/or room inside a building etc. A location may further include an uncertainty or error indication, such as a horizontal and possibly vertical distance by which the location is expected to be in error or an indication of an area or volume (e.g. a circle or ellipse) within which mobile device 105 is expected to be located with some level of confidence (e.g. 95% confidence).

The external client 180 may be a web server or remote application that may have some association with mobile device 105 (e.g. may be accessed by a user of mobile device 105) or may be a server, application, or computer system providing a location service to some other user or users which may include obtaining and providing the location of mobile device 105 (e.g. to enable a service such as friend or relative finder, or child or pet location). Additionally or alternatively, the external client 180 may obtain and provide the location of mobile device 105 to an emergency services provider, government agency, etc.

As noted, positioning of the mobile device 105 may be facilitated by a network function server 160, which may be part of a cellular network. Additionally or alternatively, the network function server 160 may be capable of facilitating other types of network-based positioning, including positioning using APs 130 (e.g., Wi-Fi positioning) and/or mobile devices 145 (e.g., Bluetooth positioning, UWB positioning, etc.). To do so, the network function server 160 may communicate with one or more devices (e.g., a target device such as the mobile device 105 and/or one or more anchor devices), coordinate positioning sessions with the one or more devices, provide assistance data for positioning-related measurements and/or calculations, receive measurement data from one or more devices for determining a position of a target device, provide synchronization-related data, or perform a combination these tasks, for example. According to some embodiments, the network function server 160 may support various procedures/methods such as Assisted GNSS (A-GNSS), Time Difference Of Arrival (TDoA) (which also may be referred to as Observed Time Difference Of Arrival (OTDoA)), Real Time Kinematic (RTK), Precise Point Positioning (PPP), Differential GNSS (DGNSS), Enhance Cell ID (ECID), angle of arrival (AoA), angle of departure (AoD), WLAN positioning, RTT, multi-cell RTT, two-way ranging (TWR) (e.g., including single-sided TWR (SS-TWR) and/or double-sided TWR (DS-TWR)), and/or other positioning procedures and methods. The network function server 160 may process location service requests for the mobile device 105 and/or third parties (e.g., a device communicatively coupled with the network function server 160 and authorized to receive a position of the mobile device 105).

To support various positioning procedures/methods, the mobile device 105 and/or one or more anchor devices may be capable of performing any of a variety of measurements and/or procedures. This can include, for example, Received Signal Strength Indicator (RSSI), RTT, Reference Signal Received Power (RSRP), Reference Signal Received Quality (RSRQ), Reference Signal Time Difference (RSTD), Time of Arrival (ToA), AoA, Receive Time-Transmission Time Difference (Rx-Tx), Differential AoA (DAoA), AoD, or Timing Advance (TA).

In some embodiments, TDoA assistance data may be provided to a mobile device 105 by the network function server 160 for a reference signal and one or more response or neighbor signals, relative to the reference signal. For example, the assistance data may provide timing, frequency, and/or other parameters of the reference and response/neighbor signals to allow a device (e.g., a target and/or anchor) to perform ToA and/or RSTD measurements for TDoA positioning. Using the RSTD measurements, the known absolute or relative transmission timing of each cell, and the known position(s) of wireless node physical transmitting antennas (e.g., anchors) for the reference and response/neighbor signals, the UE position may be calculated (e.g., by the mobile device 105 or by the network function server 160). More particularly, the RSTD for a neighbor signal “k” relative to a reference signal “Ref,” may be given as ($ToA_k$-$ToA_{Ref}$). ToA measurements for different signals may then be converted to RSTD measurements and sent to the network function server 160 by the mobile device 105. Using (i) the RSTD measurements, (ii) the known absolute or relative transmission timing of each cell, (iii) the known position(s) of physical transmitting antennas that transmit the reference and response/neighbor signals, and/or (iv) directional characteristics of the signals such as a direction of transmission, the mobile device 105 position may be determined.

Figure 2A:
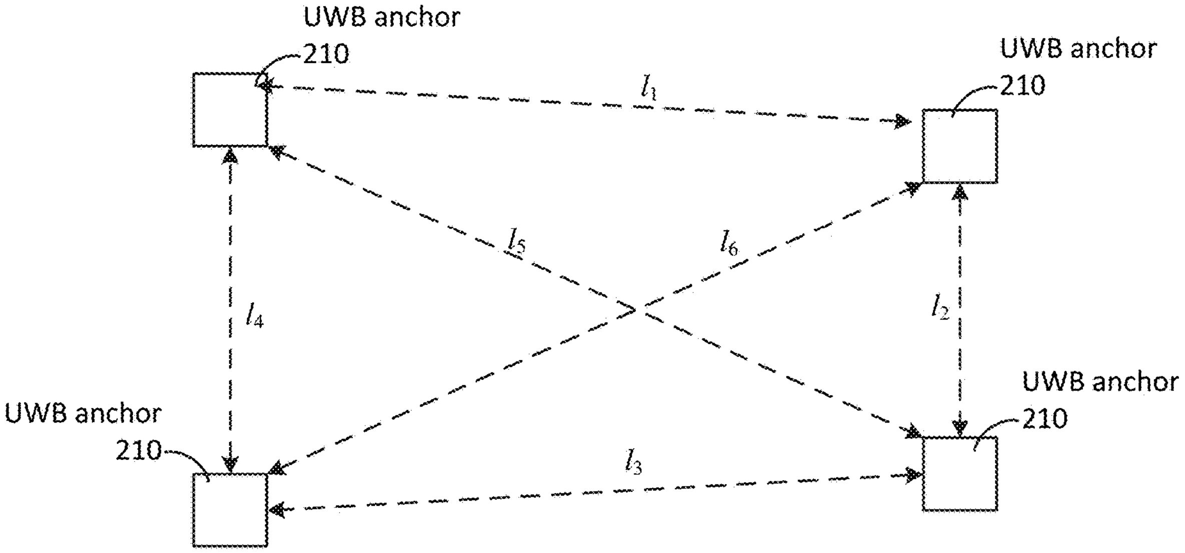
FIGS. 2A and 2B are simplified diagrams illustrating examples of how ultra-wideband (UWB) positioning/ranging may be performed in a network of UWB devices.
Figure 2B:
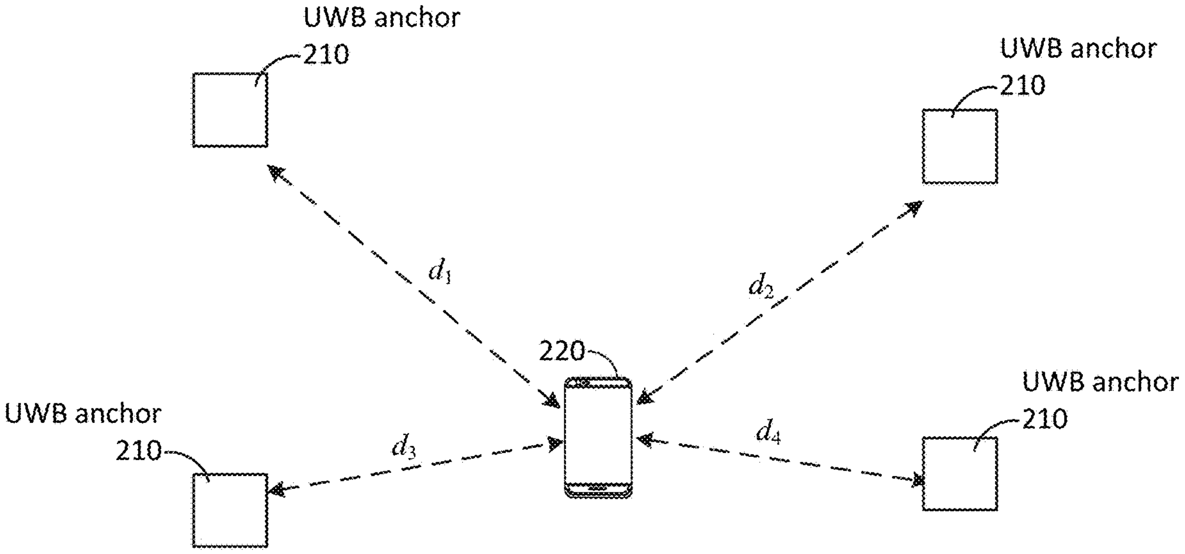

With regard to UWB-based positioning and/or sensing, UWB devices may conduct “sessions” during which the devices engage in direct communications (e.g., D2D communications) to coordinate the exchange of frames from which ToA may be determined. The positioning, different types of measurements may be performed during these sessions to conduct the UWB-based position. FIGS. 2A and 2B, discussed below, provide examples of what types of measurements may be performed. And FIGS. 3A-3B, also discussed below, provide additional details regarding UWB-positioning sessions.

As noted, UWB devices may be capable of UWB-based RF sensing (e.g., in addition or as an alternative to UWB-based positioning). RF sensing enables one or more UWB devices to detect one or more objects using RF signals (e.g., comprising one or more pulses). The RF signals transmitted by a UWB device may reflect off of the one or more objects and be received by the UWB device (e.g., in a monostatic configuration) and/or by other UWB devices (e.g., in a multi-static configuration). Information such as time-of-flight can be derived from a comparison of the timing of the transmission and reception of the RF signals, enabling the UWB device(s) to determine a distance and/or location of the one or more objects. Further, UWB devices may include multiple antennas to enable beamforming of transmitted and/or received RF signals, allowing directional information regarding the one or more objects to be determined. In such embodiments a UWB device can “scan” a space or volume by using beamforming to use different Tx and/or Rx beams to respectively transmit and/or receive RF signals in different directions (e.g., in different azimuth and/or elevation angles) across the space or volume. Further, changes in channel state information over time are indicative of object movement. Thus, RF signals can be used to determine aspects of an object such as object location (e.g., angle and range), volume (or shape), and movement.

UWB devices may vary in form and function. As indicated in FIG. 1, a UWB device may comprise a mobile device such as a mobile phone with UWB functionality. Similarly, UWB devices may comprise other personal electronics, such as laptops, tablets, personal media players, or the like. Further, as noted, UWB devices may comprise vehicles, drones, robots, or other mobile devices that may move autonomously, and may be used in consumer, industrial, military, and/or other applications. UWB devices may also comprise tracking devices used in logistical applications to track packages, shipping containers, or the like. Additionally or alternatively, UWB devices (such as UWB anchors, described hereafter) may comprise proprietary and/or dedicated RF beacons deployed at known locations for monitoring the location of tags or devices used in logistical applications and/or tracking applications (e.g., in a factory, warehouse, hospital, etc.). UWB devices may be used in proximity applications to, for example, unlock the door as a user (e.g., an authorized user) approaches. UWB devices may also be used in other applications and/or device types. Some UWB devices may also be deployed in a factory setting to monitor robots, assembled parts, or the like.

FIGS. 2A and 2B are simplified diagrams illustrating how UWB positioning may be performed in a network of UWB anchors 210. As noted, anchor devices (referred to herein as "anchors" or "UWB anchors") may comprise UWB devices with known locations that can be used to determine the position of a target 220, or "tag," using UWB RF signals. UWB positioning may be performed utilizing relevant standards (e.g., IEEE 802.15.4ab), which enable high-accuracy, low-power positioning. One or more of the UWB anchors 210 and/or UWB target 220 may be connected with a network, such as in the manner illustrated in the communication/positioning/sensing system 100 of FIG. 1. In some embodiments, the UWB anchors 210 and/or UWB target 220 may form an ad-hoc network, which may or may not be connected with a network (e.g., in the manner shown in FIG. 1). Further, the UWB anchors 210 and/or UWB target 220 may comprise any of a variety of device types, as previously indicated.

If the position of one or more UWB anchors 210 is not yet known, such as in an ad-hoc network, initial provisioning of the UWB anchors 210 may be performed. In the provisioning, UWB anchors 210 may perform ranging measurements to determine relative distances (l1-l6) between UWB devices 210, as illustrated in FIG. 2A. This can enable the UWB anchors 210 to determine the relative locations with one another and, if the absolute location of any UWB anchor 210 is known, the absolute locations (e.g., with respect to a coordinates system). Once the positions of the UWB anchors 210 are known, the determination of the location of a target 220 can be made by determining the distances (d1-d6) between the UWB anchors 210 and target 220. These distances can be determined using a variety of positioning-related measurements and/or procedures. This can include, for example, RSTD, ToA, two-way ranging (TWR) (e.g., single-sided TWR (SS-TWR) and/or double-sided TWR (DS-TWR)), TDoA, and more. Additionally or alternatively, angle-based measurements may be made for positioning of the target 220, including angle of arrival (AoA) and/or Angle of departure (AoD).

As noted, a group of UWB anchors 210 may conduct sessions in which UWB anchors 210 perform a series of operations to determine the position of one or more of the devices, and during which the UWB anchors 210 engage in direct communications (e.g., D2D communications) to coordinate the exchange of data, synchronize (e.g., for TDoA positioning). A group of UWB anchors 210 may be called a "cluster," and a network of UWB devices may comprise multiple clusters. Each cluster may include any number of UWB anchors 210, and different clusters may overlap, such that one or more UWB anchors 210 may be a part of one or more different clusters.

Figure 3A:
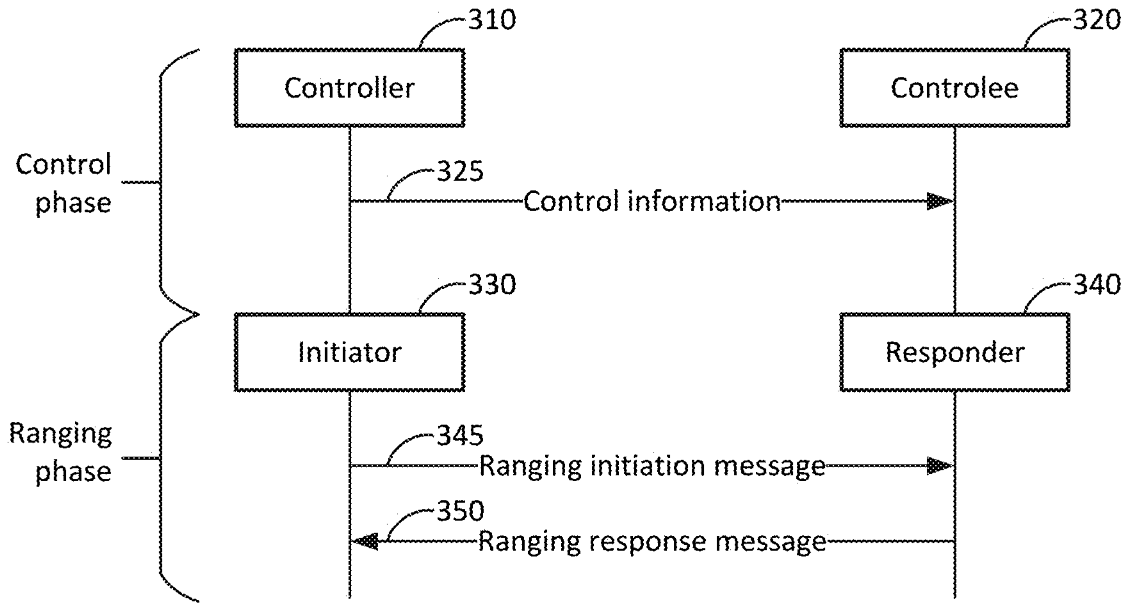
FIGS. 3A and 3B are flow diagrams illustrating how different devices may assume different roles with regard to a UWB positioning session.
Figure 3B:
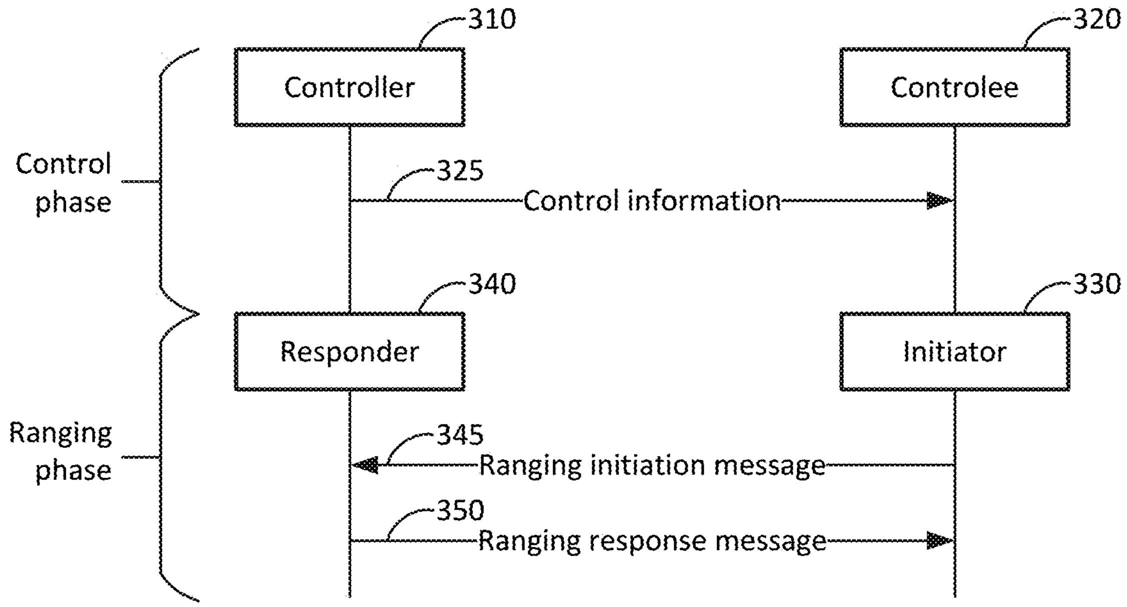

FIG. 3A is a flow diagram illustrating the roles different devices may assume with regard to a UWB ranging session (or simply a "UWB session"), which may be conducted in accordance with a relevant UWB positioning standard (e.g., IEEE 802.15.4ab). Here, each UWB device may be referred to as an enhanced ranging device (ERDEV). ERDEVs may be referred to by different terminologies (e.g. initiator/responder or controller/controlee) at different layers of the network stack. The terms initiator and responder (described hereafter) would be used at lower layers (e.g., at UWB physical (PHY) and media access control (MAC) layers), while the terms controller and controlee (also described hereafter) may be used at higher layers (e.g., an application layer of the ERDEVs). For a cluster of UWB devices including one or more UWB anchors, a first UWB anchor may be an initiator and/or controller, and one or more other UWB anchors and/or UWB devices may be responders and/or controlees. Any pair of devices in FIGS. 2A and 2B between which measurements are made (e.g., two UWB anchors 210 or a UWB anchor 210 and a UWB target) may comprise a controller/controlee and initiator/responder pair as shown in FIGS. 3A and 3B.

As indicated, for a pair of ERDEVs communicating with each other, the controller 310 is an ERDEV that sends control information 325 to a receiving ERDEV, designated as the controlee 320. The control information 325 may include parameters for the UWB ranging session, such as timing, channel, etc. Although not illustrated, the controlee 320 can send an acknowledgment to the control information 325, may negotiate changes to the parameters, and/or the like.

The exchange between controller 310 and controlee 320, including the sending of the control information 325 and subsequent related exchanges between controller 310 and controlee 320 regarding control information, may be conducted out of band (OOB) using a different wireless communication technology (e.g., Bluetooth or Wi-Fi), prior to a ranging phase. Put differently, a UWB session may be associated with a control phase and a ranging phase, where the control phase (which may take place on an OOB link) comprises a preliminary exchange between controller 310 and controlee 320 of parameter values for the ranging phase, and the subsequent ranging phase comprises the portion of the UWB session in which devices exchange messages within the UWB band for ranging measurements. (It can be noted, however, that some control information may be exchanged within the UWB band (e.g., a "ranging control phase" occurring in the first slot of a UWB round). Accordingly, some aspects of the control phase may be considered to occur in-band, subsequent to the preliminary OOB exchange between the controller 310 and controlee 320.)

The UWB session may occur afterward, in accordance with the parameters provided in the control information. In the ranging phase of the UWB session, one ERDEV may take the role of an initiator 330 and the other ERDEV may take the role of a responder 340. As indicated in FIG. 3A, the initiator 330 may initiate UWB ranging by sending a ranging initiation message 345 to the responder 340, to which the responder 340 may reply with a ranging response message 350, and timing measurements may be made of these messages (by the devices receiving the messages) to perform two-way ranging (TWR). Depending on the parameters of the control information 325, additional exchanges may be made in the ranging phase between the initiator 330 and responder 340 to allow for additional ranging measurements.

The roles of initiator 330 and responder 340 may be indicated in the control information 325. Further, as indicated in FIG. 3A, the controller 310 in the control phase may be the initiator 330 in the ranging phase of the UWB session. Alternatively, as indicated in FIG. 3B, the controller 310 in the control phase may be the responder 340 in the ranging phase. The determination of which device is initiator 330 and which is responder 340 may depend on the parameters set forth in the control information 325, in which case the controlee 320 correspondingly becomes either the responder 340 or the initiator 330. According to some embodiments, a controller/initiator may conduct ranging with multiple controlees/responders.

Although FIGS. 3A and 3B in the above description referred to "ranging" phases and messages, sensing may be performed similarly. That is, UWB devices may perform UWB sessions for sensing, or both ranging and sensing, in a manner similar to the UWB session for ranging shown in FIGS. 3A and 3B.

Figure 4A:
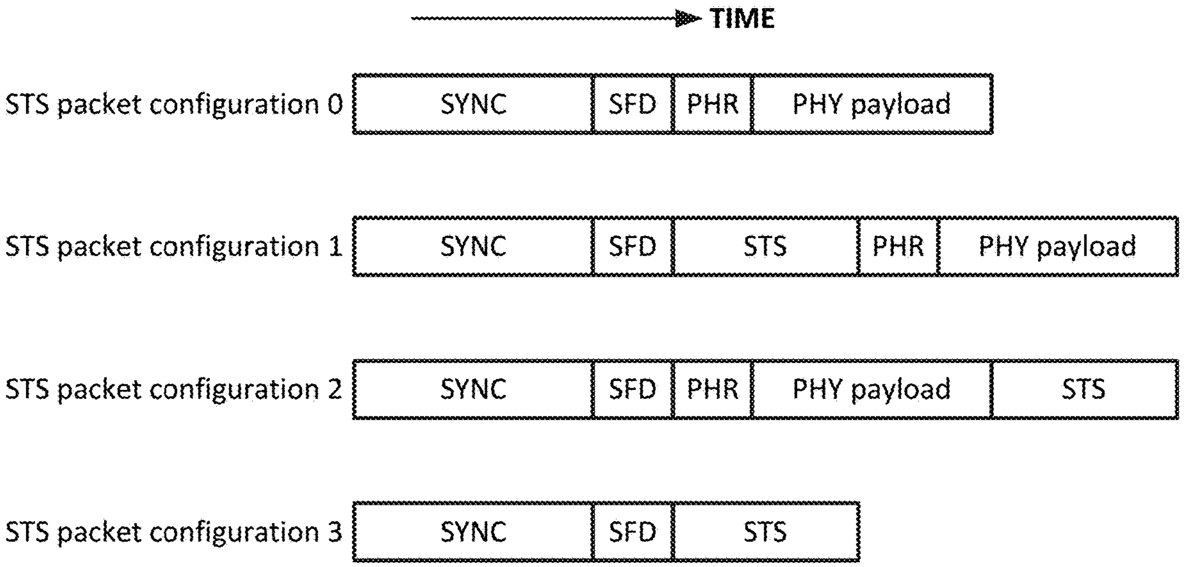
FIG. 4A is an illustration of different packet configurations that can be used in a UWB session at the UWB physical (PHY) layer.

FIG. 4A is an illustration of different packet configurations that can be used in a UWB session (e.g., for sensing and/or positioning) at the UWB PHY layer, which may be used in some embodiments. These packet configurations may be defined and/or used in relevant UWB standards (e.g., IEEE 802.15.4z). As shown, ranging functionality may be based on channel estimation using the SYNC preamble, included in each of the four possible configurations (e.g., configurations 0-3) used in current configurations. (Configuration 0 is currently used as a default configuration.) The SYNC preamble may comprise a bit sequence (such as a Ipatov ternary sequence, Gold sequence, Golay sequence, polyphase sequence like Zadoff-Chu sequence, etc.) that exhibits good autocorrelation properties (e.g., sufficient for ranging/sensing measurements). As illustrated, the different packet configurations may also include a start of frame delimiter (SFD) to help demarcated the SYNC preamble from the rest of the packet, a PHY payload for conveying data (e.g., for communication, time stamp information, etc.), and/or a scrambled timestamp sequence (STS). The STS is a security feature with a unique sequence known to transmitter and receiver, which can authenticate the data packet source and help prevent over-the-air attacks that can falsify a ToA estimate for ranging/sensing in a UWB session. This aspect of UWB ranging/sensing is described in more detail with regard to FIG. 4B.

Figure 4B:
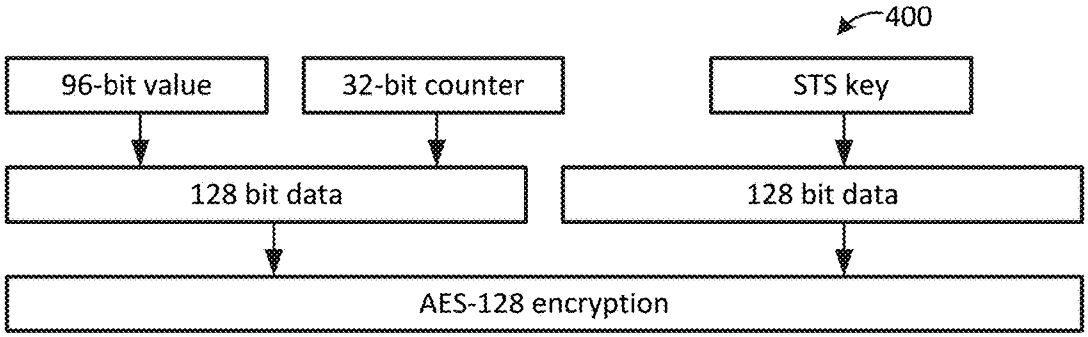
FIG. 4B is an illustration of a deterministic random bit generator (DRBG) that can be used to generate a scrambled timestamp sequence (STS).

FIG. 4B is an illustration of a deterministic random bit generator (DRBG) 400 that can be used to generate an STS, which may be used in some embodiments. Here, the DRBG 400 is based on Advanced Encryption Standard (AES)-128 in counter mode. As illustrated, the DRBG 400 uses a 96-bit value, a 32-bit counter, and an STS key. The STS key may be exchanged securely between ERDEVs (e.g., an initiator and one or more responders) prior to the UWB session. For example, an STS key may be provided by the controller (e.g., controller 310 of FIG. 3A or 3B), for example, at the application layer over a secure link (e.g., an OOB link). DRBG bits {0, 1} may be mapped to {+1, −1} and spread. This can result in a ternary sequence of {−1, 0, +1} chips. The ternary sequences may then be grouped (e.g., group of 32) to form an active STS segment.

Figure 4C:
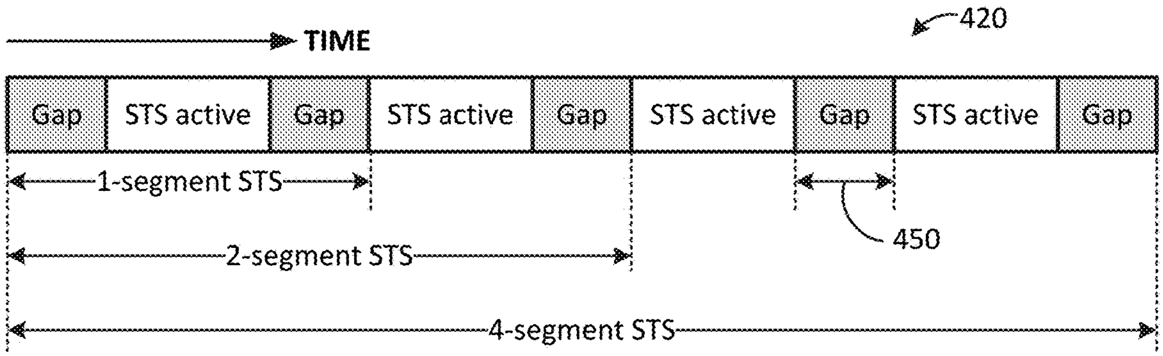
FIG. 4C is a timing diagram illustrating example STS segments 420, according to an embodiment.

FIG. 4C is a timing diagram illustrating example STS segments 420, according to an embodiment. One to four active STS segments may be encapsulated by "gaps" having a duration (arrow 450) of 512 chips (~1 us) to form the STS. Again, the resulting segmented STS may be used for sensing and/or ranging applications and may correspond to the STS portion of a PHY layer packet configuration (e.g., as shown in FIG. 4A).

It can be noted that, although embodiments described herein and portrayed in the figures discuss the use of an STS field, embodiments are not so limited. STS is for secure ranging, but embodiments may apply to non-secure ranging. Specifically, a sensing field, or SENS (e.g., as defined by the IEEE 15.4ab standard), includes non-encrypted sequences with good auto-correlation properties and may be used by embodiments in addition or as an alternative to STS, for the purpose of sensing and/or ranging.

Figure 5:
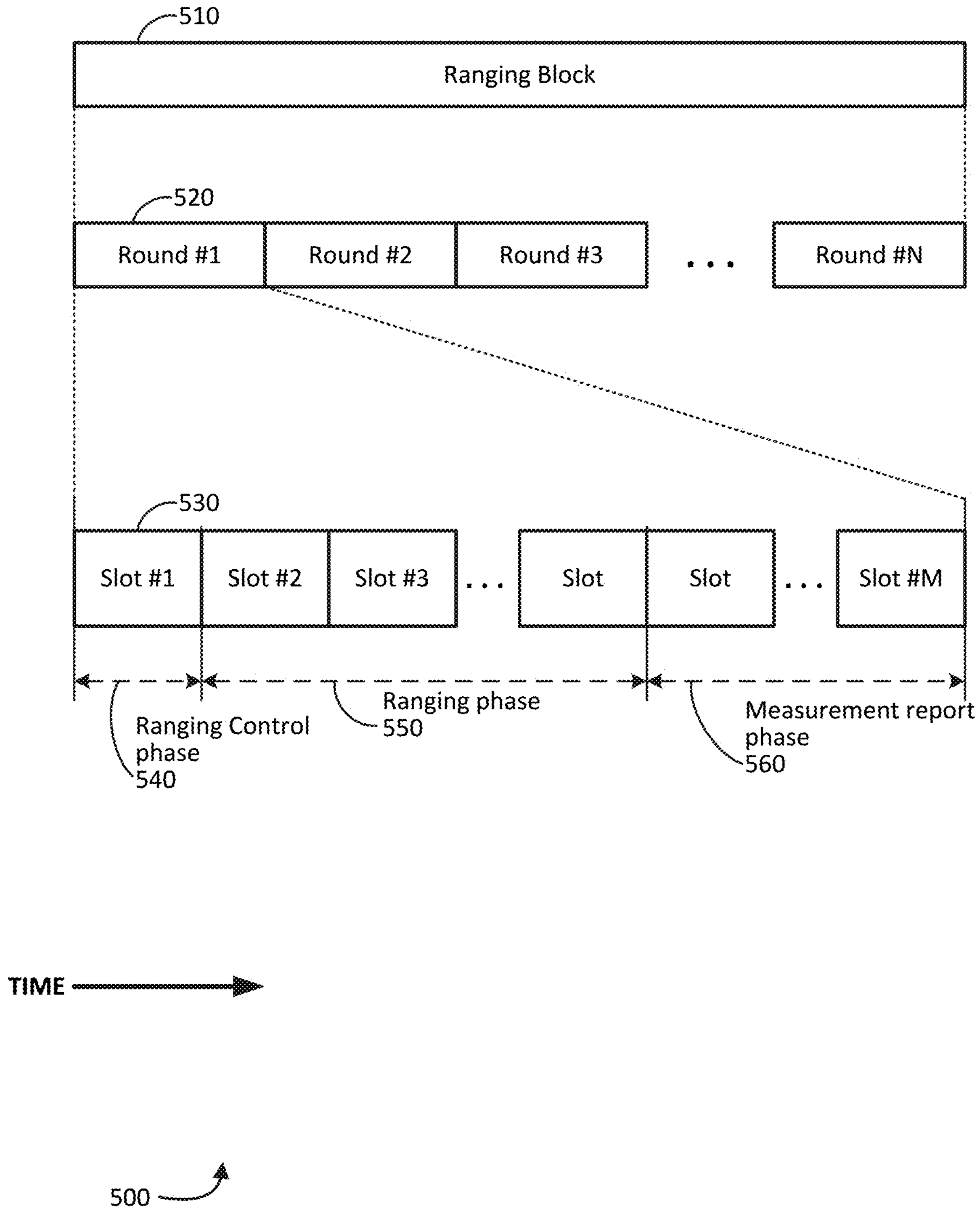
FIG. 5 is a timing diagram of how time may be measured and utilized within a UWB positioning session.

FIG. 5 is a diagram 500 illustrating how time may be segmented and utilized within a UWB positioning session, which may be used in some embodiments. A UWB session may occur over a period of time divided into sub-portions according to a hierarchical structure. This timing comprises one or more consecutive ranging blocks 510, which may have a configurable duration (e.g., 200 ms). (For simplicity, only one ranging block 510 is shown in FIG. 5. However, a UWB session may utilize multiple blocks, which may occur in succession. Also, although called "ranging" blocks 510, they may be used for ranging and/or sensing.) Each ranging block 510 may be split into one or more successive rounds 520 (e.g., N rounds). The number and length of the rounds may be configurable. The rounds 520 may be further split into different slots 530, which also may have a configurable number and length (e.g., 1-2 ms). According to some embodiments, multiple rounds may be used for interference handling. For example, a given responder may transmit a message within only a single round per block, and the round index may either be statistically configured by the controller or selected per a hopping pattern.

The slots within round 520 may be allocated for different purposes. For example, the initial slot may be dedicated as the ranging control phase 540, in which an initiator UWB device (e.g., an initiator anchor), transmits control information for the other UWB devices participating in a UWB session (e.g., responder anchors and/or other UWB devices). This information can include, for example, an allocation of slots among the different responder devices. During the subsequent ranging phase 550, the different responder may transmit in accordance with the allocated slot. That is, each responder may be allocated a corresponding slot in the ranging phase 550 to transmit one or more ranging/sensing signals. The ranging phase 550 may be followed by a measurement report phase 560 in which UWB anchors in a cluster may report measurements (e.g., of signals measured during the ranging phase 550). The structure of the initiation and/or response messages may use the PHY format previously described with respect to FIG. 4A.

Figure 6:
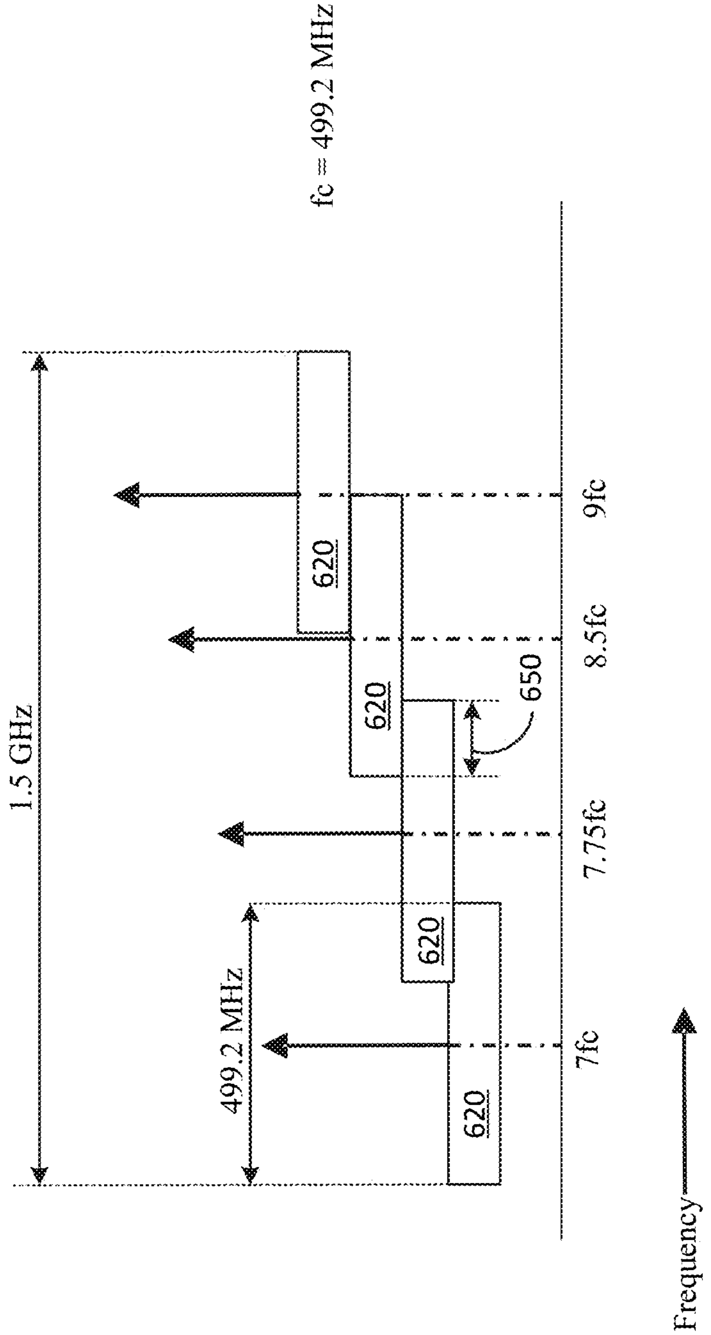
FIG. 6 is a frequency diagram, illustrating how frequency stitching may be performed in UWB for radio frequency (RF) sensing and/or ranging, according to some embodiments.

FIG. 6 is a frequency diagram 600, illustrating how frequency stitching may be performed in UWB for RF sensing and/or ranging in UWB sessions. In this diagram 600, different RF signals used for RF sensing/ranging have different carrier frequencies (7 fc, 7.75 fc, etc.), which may represent different UWB channels. The RF signals further have respective bandwidths represented by blocks 620. In this example, the value of fc and the bandwidth are 499.2 MHZ, although embodiments may vary. Frequency domain stitching of sensing/ranging measurements across multiple carrier frequencies can be used in order to perform UWB ranging/sensing at artificially higher bandwidth. This can provide resolution for RF sensing/ranging due to the higher bandwidth of the sensing waveform, and ultimately higher accuracy for sensing/ranging.

Overlap between measurements (e.g., shown by arrow 650) may help avoid artifacts due to measurements being in different carrier frequencies. In the example of FIG. 6, a 25% overlap leads to a 124.8 MHz carrier offset (0.25*499.2 MHz=124.8 MHz), and a 75% overlap leads to a 374.4 MHz carrier offset (0.75*499.2 MHz=374.4 MHz) between frequencies. Depending on desired functionality, the amount of overlap can vary.

According to some embodiments, the amount of overlap can be non-uniform to achieve larger frequency coverage and bandwidth within the allowable UWB spectrum. As illustrated in diagram 600, some channels (e.g., 7 fc, 7.75 fc, and 8.5 fc) may have a uniform grid spacing/overlap (e.g., 75% grid spacing/25% overlap). However, the last channel (9 fc), may have a greater overlap (50% overlap). The non-uniformity of this last channel may be due, for example, to the last channel being at the edge of the usable spectrum. In other words, the last channel may be fixed; a channel using higher frequency would extend beyond the UWB spectrum.) Even so, it can be stitched with the other frequencies to achieve larger bandwidth for UWB sensing/ranging. As illustrated, in the example of FIG. 6, the total effective bandwidth of all channels after stitching is 1.5 GHz.

To enable a UWB device to transmit/receive on multiple frequencies/channels, the device may need to re-tune its transceiver to a different frequency after each transmission/reception. Further, it may be desirable to help ensure transmission/reception at different frequencies occurs close in time, to help ensure accurate sensing/ranging in the presence of potential movement. Embodiments herein provide ways in which gaps may be specified to allow this RF retuning of a UWB transceiver for frequency domain stitching.

It can be noted that the RF signal transmission and RF retuning time periods in the embodiments described hereafter may be determined by a configuring device. This configuring device may comprise the UWB initiator device, the UWB responder device, or a device communicatively coupled with both (e.g., a server). According to some embodiments, the configuring device communicates with the UWB initiator device, the UWB responder device, or both using one or more control messages. These control messages may be sent, for example, prior to the UWB session(s). Moreover, these control messages may be sent using an out-of-band (OOB) communication link (e.g., Bluetooth, NR, Wi-Fi, etc.). Control messages may be used to communicate device capability and/or configuration information (e.g., to use during the UWB session(s)), for example. According to some embodiments, a controller (e.g., as described with respect to FIGS. 3A and 3B, may operate as a configuring device and may send control messages during a control phase of a UWB session.

According to some embodiments, a first option for retuning a UWB device within a UWB slot/round structure comprises using allowing for retuning during gaps in a segmented STS. As described previously with respect to FIG. 4C, an STS transmitted in a slot may have multiple segments. Because this retuning may occur within a single transmission (e.g., a single slot), this option can help ensure transmissions in different frequencies occur close in time with one another, which again can help minimize error/inaccuracy due to movement. Because gaps may be relatively short (again, on the order of 1 μs), not all UWB devices may be capable of doing so. Thus, for UWB sessions involving multiple UWB devices (e.g., ranging and/or multi-static sensing) capability information regarding retuning may be exchanged prior to the RF transmissions.

To accommodate the capabilities of some UWB devices, some embodiments may allow for larger gaps. That is, if a UWB device is incapable of retuning within the duration of a standard gap, the length of a gap duration between STS segments may be increased. Depending on desired functionality, the length of the gap may be selected from an enumerated list of predetermined gap lengths (e.g., which may be defined in an applicable standard) or may be specified (e.g., in an information exchange between a UWB initiator and responder). According to some embodiments, the UWB initiator may select/specify the gap length, which may be based on capability information received from a UWB responder.

Because RF retuning occurs within gaps between segments according to this option, different STS segments are transmitted at different STS frequencies/channels. Depending on desired functionality, retuning can occur at every gap (e.g., resulting in a different carrier frequency for each STS segment) or less frequently. Retuning every other gap, for example, would result in each STS segment being transmitted twice at a given frequency before retuning occurs. According to some embodiments, additional STS segments may be included to support multiple-segment transmission for each carrier frequency and/or additional carrier frequencies. For example, transmitting eight STS segments would allow transmission of two STS segments at each carrier frequency when stitching four carrier frequencies, or it could allow stitching of up to eight carrier frequencies (one STS segment for each carrier frequency). If additional STS segments are added, it may involve transmitting multiple STS sequences (e.g., where each sequence is split into up to four segments). Thus, the number of STS segments used may generally correlate with the number of different UWB channels used in the RF transmissions.

Figure 7A:
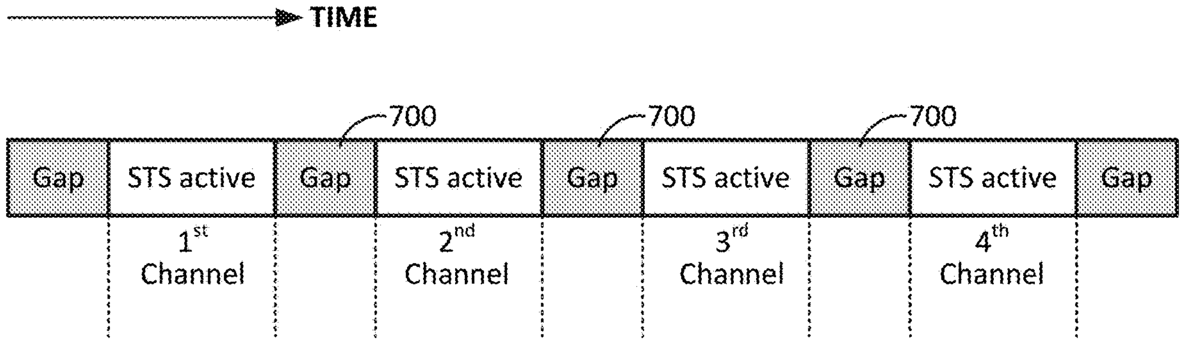
FIGS. 7A and 7B are timing diagrams illustrating examples of how segmented STS may be used for retuning, according to some embodiments.
Figure 7B:
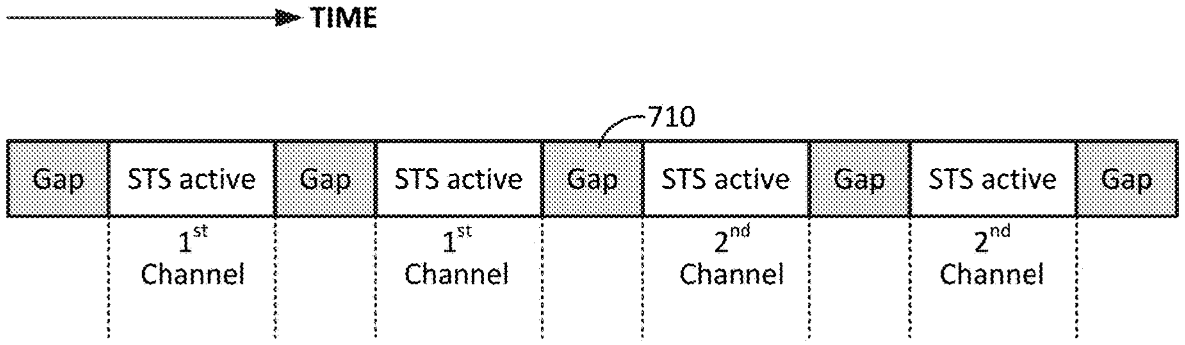

FIGS. 7A and 7B are timing diagrams illustrating examples of how a four-segment STS may be utilized, according to the first option. FIG. 7A is a first timing diagram involving the transmission of RF signals on four different channels using four STS segments. As illustrated, UWB devices (transmitters and/or receivers) can retune on each of the gaps 700 in order to transmit/receive the subsequent RF signal. FIG. 7B is a second timing diagram involving the transmission of RF signals on two different channels using four STS segments. In this case, UWB devices need only retune at gap 710, when the transmissions change from the first channel to the second channel. As noted above, multiple segmented STS transmissions (e.g., in addition to the segmented STS shown) may be used (e.g., in successive slots) if more channels are used for frequency stitching. An STS with fewer segments (than the four illustrated in FIGS. 7A and 7B) may be used in cases where fewer channels/carrier frequencies are used.

According to some embodiments, a second option for retuning a UWB device within a UWB slot/round structure comprises signing multiple successive slots of a UWB session to a single UWB device, allowing the UWB device to use a different carrier frequencies/channel in each slot. As previously noted, UWB sessions traditionally allow devices to transmit during a single slot. However, according to embodiments, this can be modified to allow transmitting and receiving UWB devices performing ranging and/or sensing to perform RF retuning between each slot. Similar to the first option, UWB devices may exchange capability information (e.g., via control messages) to indicate the amount of time needed to perform RF retuning. In comparison with the first option, this second option allows USB devices more time to perform RF retuning. That is, RF retuning can occur between messages/STS sequences, rather than within gaps between STS segments. (This comes at the cost, however, of higher over-the-air (OTA) time for performing the RF sensing/ranging. UWB measurements using four carrier frequencies may span four slots using the second option, for example, rather than one slot using the first option.)

Figure 8A:
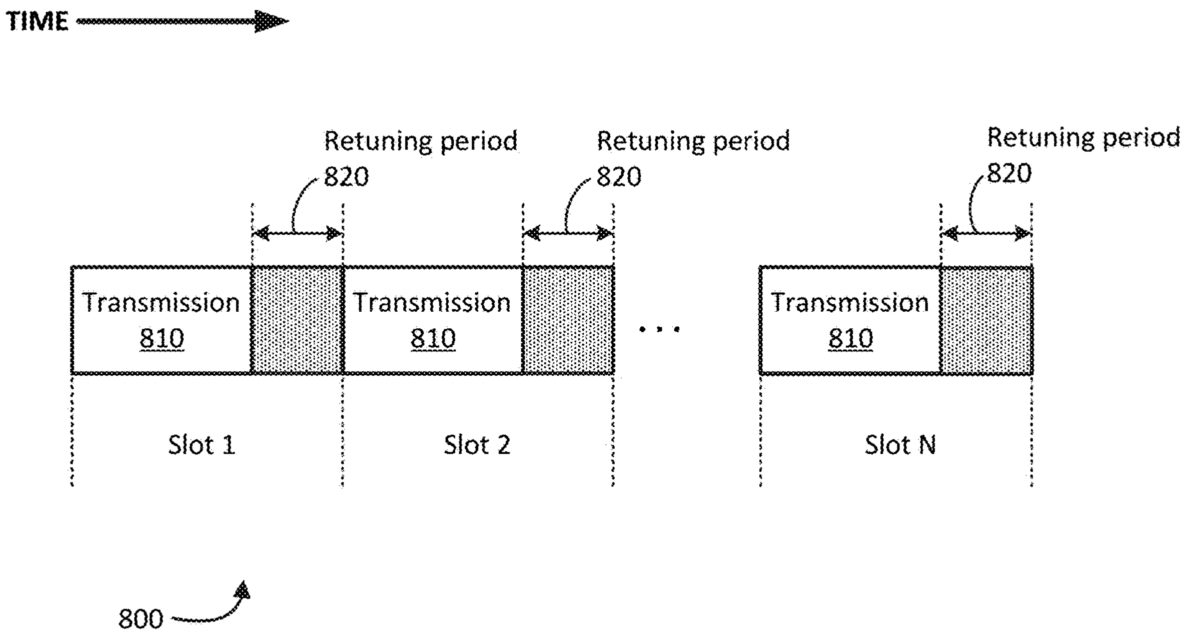
FIGS. 8A and 8B are timing diagrams illustrating examples of how a series of time slots may be used for retuning, according to some embodiments.
Figure 8B:
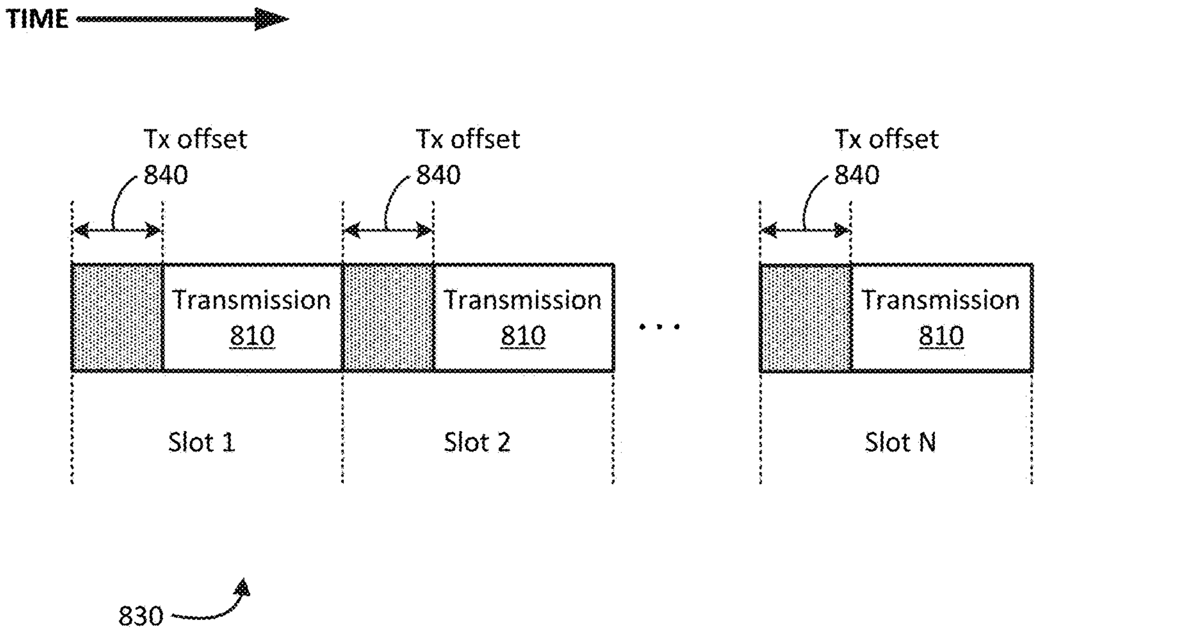

The time between slots for retuning may be allocated in different ways. For example, as illustrated in the timing diagram 800 of FIG. 8A, slot length may be adjusted to allow a sufficient retuning period 820 for the transmission/reception of one or more messages/STS sequences, then perform RF retuning before the beginning of the next slot (in which the process may be repeated at a different carrier frequency). Additionally or alternatively, as illustrated in the timing diagram 830 of FIG. 8B, Tx offset 840 may be designated at the beginning of a slot to allow for RF retuning. By using a Tx offset in this way, an initiator UWB device can have a very flexible way in which to provide a gap for RF retuning that accommodates the capabilities of the initiator and/or responder UWB devices. The timing of the slots/retuning period/Tx offset may be configured to accommodate the specific needs of a UWB device, which may report how much time it needs to retune to a configuring device.

Because this second option results in a longer period of time in which UWB sensing/ranging measurements occur, it may be less desirable than the first option in environments in which movement (e.g., above a threshold speed) is occurring. Thus, a UWB device (e.g., the UWB initiator) may determine whether to use the first option or the second option, based on factors such as detected movement (and optionally the speed of that movement), capabilities of UWB devices, and so forth. If UWB devices are simply incapable of performing UWB sensing/ranging using the first option, for example, the UWB initiator may then choose to perform the UWB sensing/ranging using the second option. However, if UWB devices are capable of performing UWB sensing/ranging using the first option, the UWB initiator may choose to perform UWB sensing/ranging using the first option, especially if any known or detected movement (e.g., of the UWB initiator, UWB responder, nearby objects, etc.) occurs at a speed that could introduce errors in measurements taken when performing UWB sensing/ranging using the second option.

Figure 9:
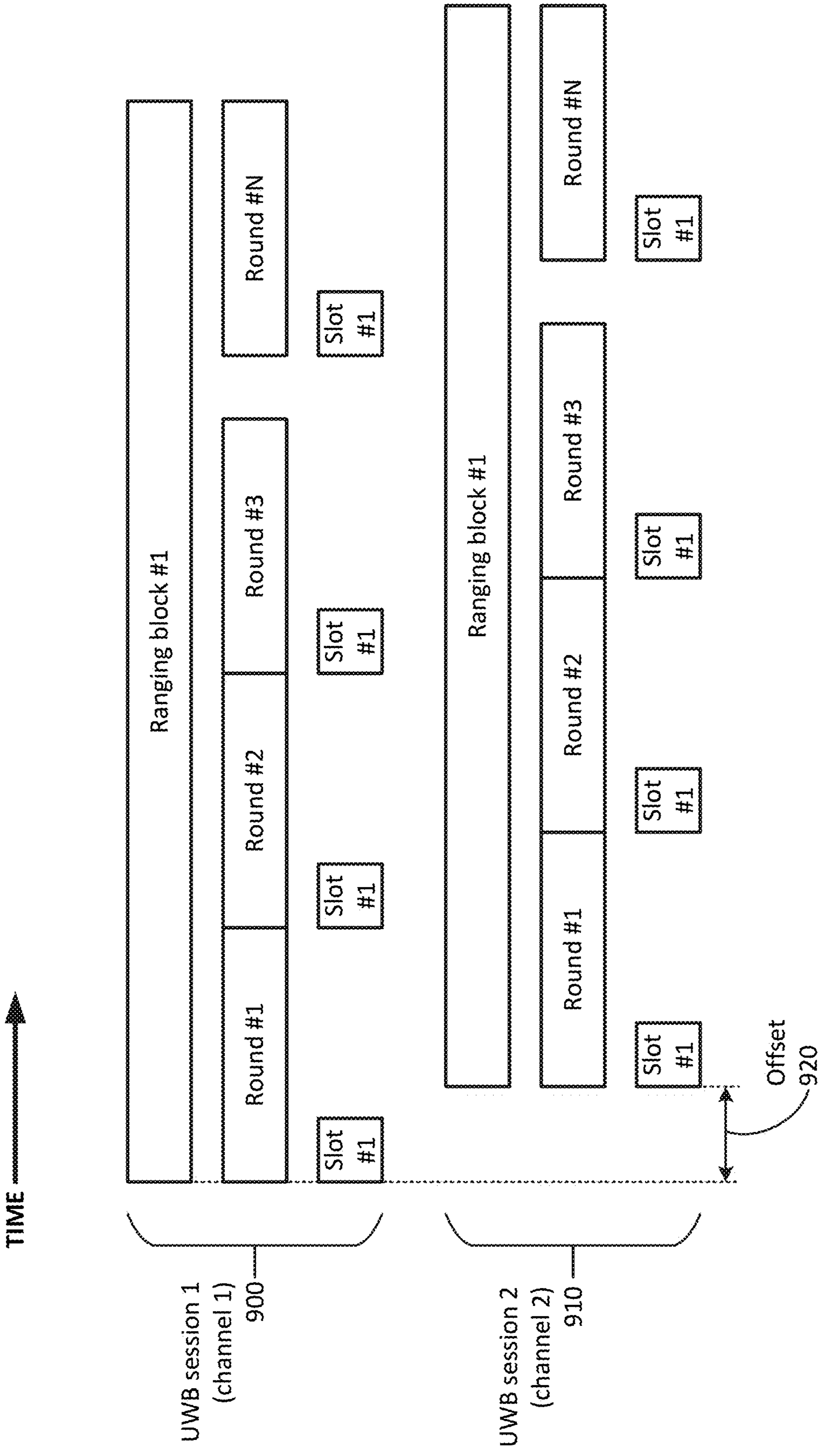
FIGS. 9-11 are timing diagrams illustrating examples of how simultaneous (overlapping in time) UWB sessions may be used for retuning, according to some embodiments.
Figure 10:
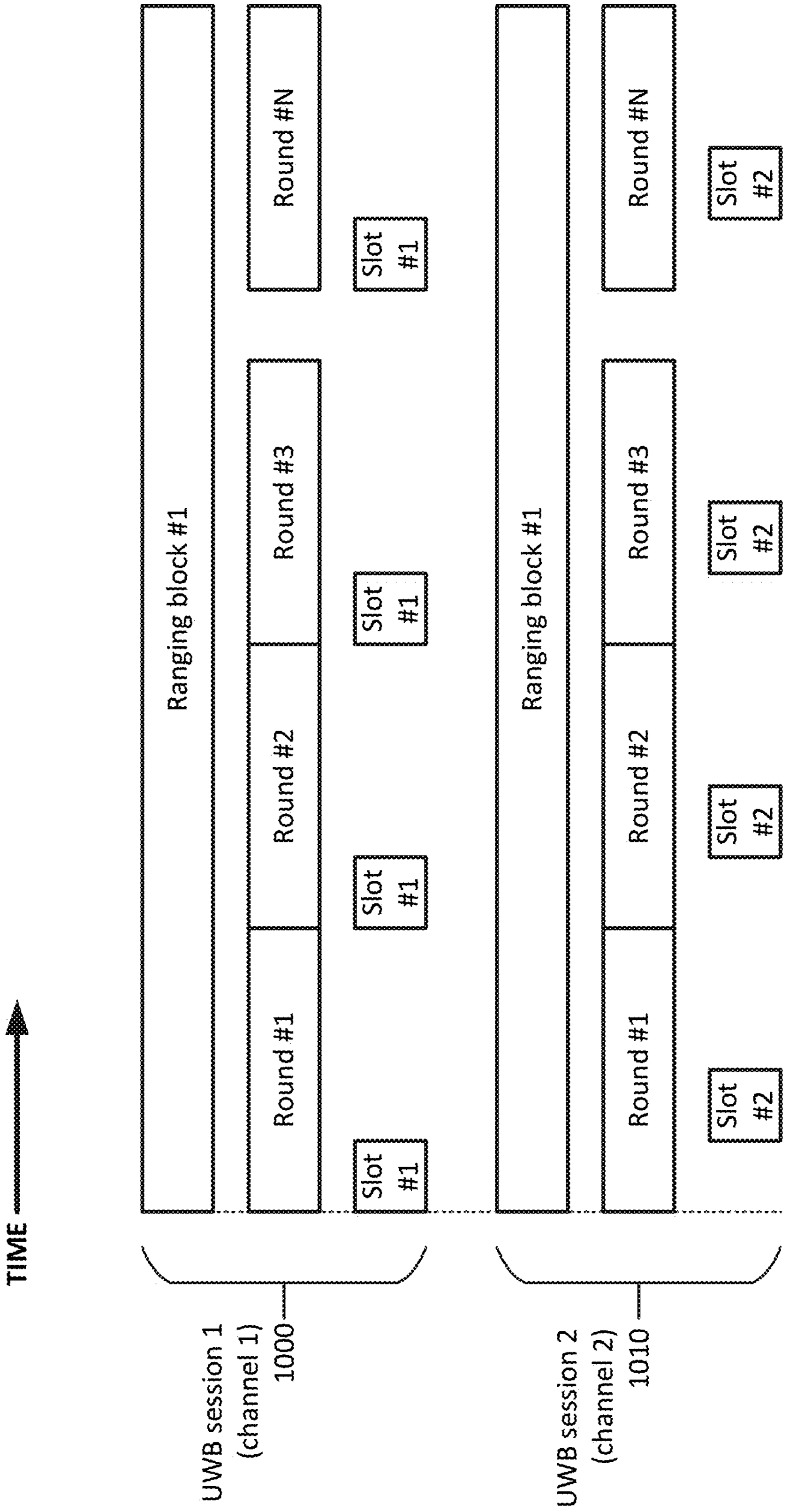
Figure 11:
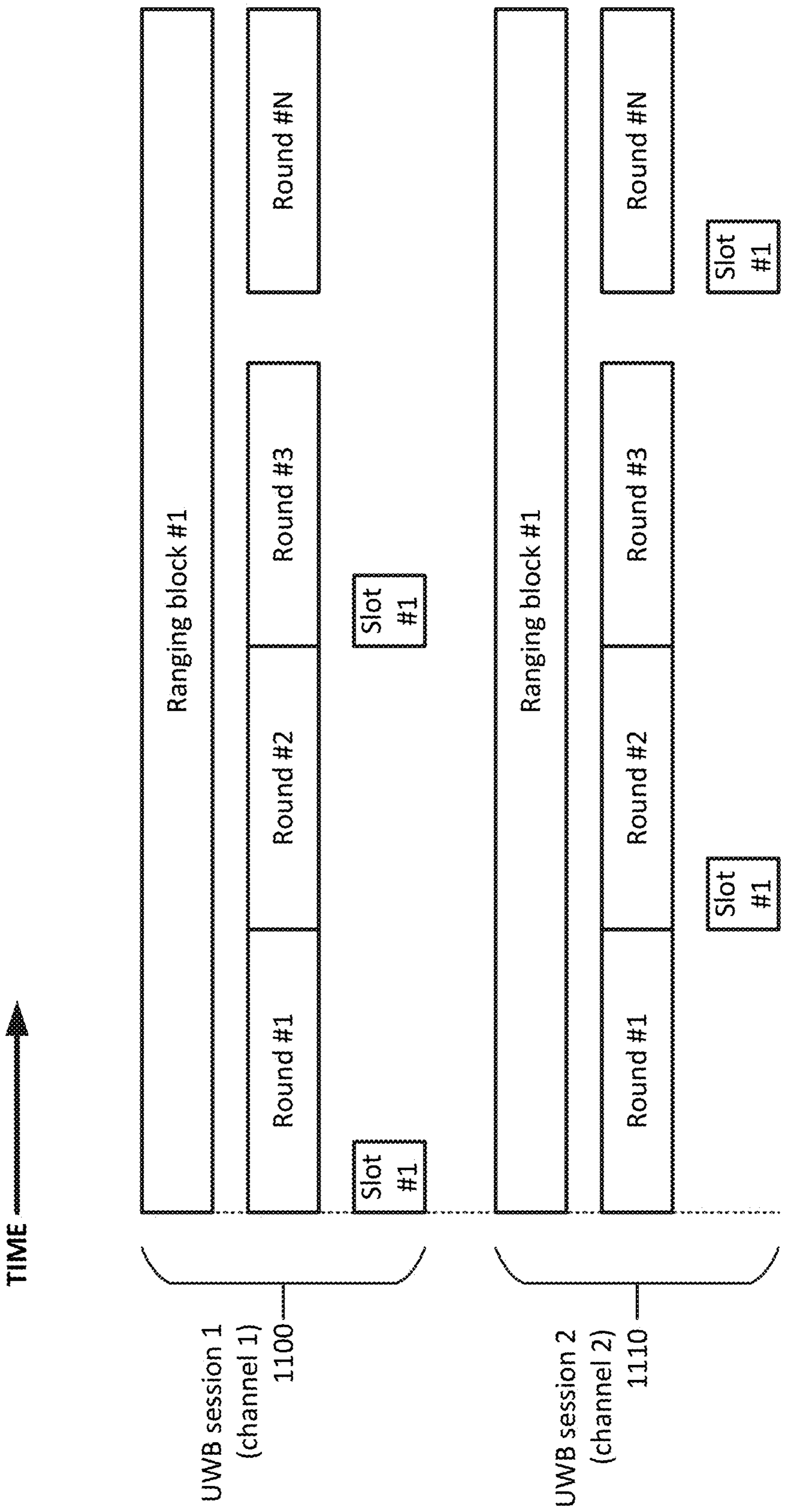

According to some embodiments, a third option for retuning a UWB device within a UWB slot/round structure comprises using multiple UWB ranging/sensing sessions simultaneously (during overlapping periods of time) at different frequencies. However, the sessions and/or slots within sessions can be offset to enable retuning. FIGS. 9-11 show three different ways in which simultaneous UWB sessions can be conducted, according to this third option. It can be noted that these options can be implemented without changes to the existing applicable UWB specifications.

FIG. 9 is a timing diagram that illustrates a first variation of the third option for retuning. Here two simultaneous UWB sessions are illustrated: a first session 900 corresponding to a first channel (or carrier frequency), and a second session 910 corresponding to a second channel. As with other figures herein, FIG. 9 is provided as a non-limiting example. Variations to the example shown in FIG. 9 may be made based on desired functionality. For example, more sessions may be conducted if more channels are used for RF sensing/positioning.

According to this variation, retuning is provided for using a time offset between different sessions. In FIG. 9, for example, the offset 920 between the first session 900 and the second session 910 allows a UWB device sufficient time to retune between the first slot of the first session 900 and the first slot of the second session 910. As illustrated in FIG. 9, according to this variation, each session may use the same slot index of each round to transmit at different carrier frequencies, although different embodiments may use different slot indices for different sessions. Ultimately, the time offset between sessions can be configured to allow transmission during the slot of one UWB session and retuning to the frequency/channel used in another UWB session, prior to transmitting during the slot of the other UWB session.

FIG. 10 is a timing diagram that illustrates a second variation of the third option for retuning. Similar to FIG. 9, two simultaneous UWB sessions are illustrated: a first session 1000 corresponding to a first channel (or carrier frequency), and a second session 1010 corresponding to a second channel. Again, alternative embodiments may implement variations to the example shown in FIG. 10, including more sessions if more channels are used for RF sensing/positioning.

According to this variation, retuning is provided for using different slot indices to transmit at different carrier frequencies. In FIG. 10, for example, the first session 1000 and the second session 1010 start at (e.g., substantially) the same time. However, each session uses a different slot index in which the UWB sensing/ranging signals are transmitted. In the first session 1000, the first slot of each round is used, whereas, in the second session 1010, the second slot of each round is used. Again, the slot indices (and parameters of the slots, including Tx offset within a slot) may be selected to ensure sufficient time to allow transmission during the slot of one UWB session, as well as retuning to the RF frequency used in another UWB session, prior to transmitting during the slot of the other UWB session.

FIG. 11 is a timing diagram that illustrates a third variation of the third option for retuning. Similar to FIGS. 9 and 10, two simultaneous UWB sessions are illustrated: a first session 1100 corresponding to a first channel (or carrier frequency), and a second session 1110 corresponding to a second channel. Again, alternative embodiments may implement variations to the example shown in FIG. 11, including more sessions if more channels are used for RF sensing/positioning.

According to this variation, retuning is provided for using different rounds to transmit at different carrier frequencies. For example, in FIG. 11, although the first session 1100 and the second 1110 both use the same slot index (slot 1) for RF transmissions, each session uses different rounds. Specifically, transmissions in the first session 1100 occur in slot 1 of odd-numbered rounds, and RF transmissions in the second session 1110 occur in slot 1 of even-numbered rounds. Using different rounds in this manner can help ensure sufficient time to allow transmission during the slot of one UWB session, as well as retuning to the RF frequency used in another UWB session, prior to transmitting during the slot of the other UWB session. As can be seen, however, this option may use more OTA time than other options, and therefore, according to some embodiments, may be selected when movement is determined to be slow enough to allow for UWB devices to use this option without introducing error (e.g., beyond a threshold amount) due to movement.

The type option used for retuning and/or other features of retuning (including a type of variation of the third option) may be determined based on desired functionality, UWB capability, and/or other factors. As noted previously, capability information may be provided configuring device (e.g., controller UWB for server) by UWB devices that will be participating in the positioning/sensing session (e.g., initiator and responder), prior to the session. The configuring device can then determine an appropriate configuration based on UWB device capabilities. For example, depending on the device capabilities, the devices may not be able to retune in a small grid, and large overlap may not be feasible. Grid spacing may be configurable based on device capabilities and may be agreed upon by participating UWB devices before the start of the session. Signaling (e.g., in a control phase) may be used to exchange the capabilities between the initiator and responder, and such signaling may be in-band or OOB. If devices have different capabilities in tuning resolution, the least capable device would dictate the frequency grid spacing. Additionally or alternatively, according to some embodiments, the gap for retuning time between transmissions at different carrier frequencies/channels may be negotiable. If the gap time is fixed, it may be long enough for different implementations to be capable of retuning during the fixed gap duration.

Figure 12:
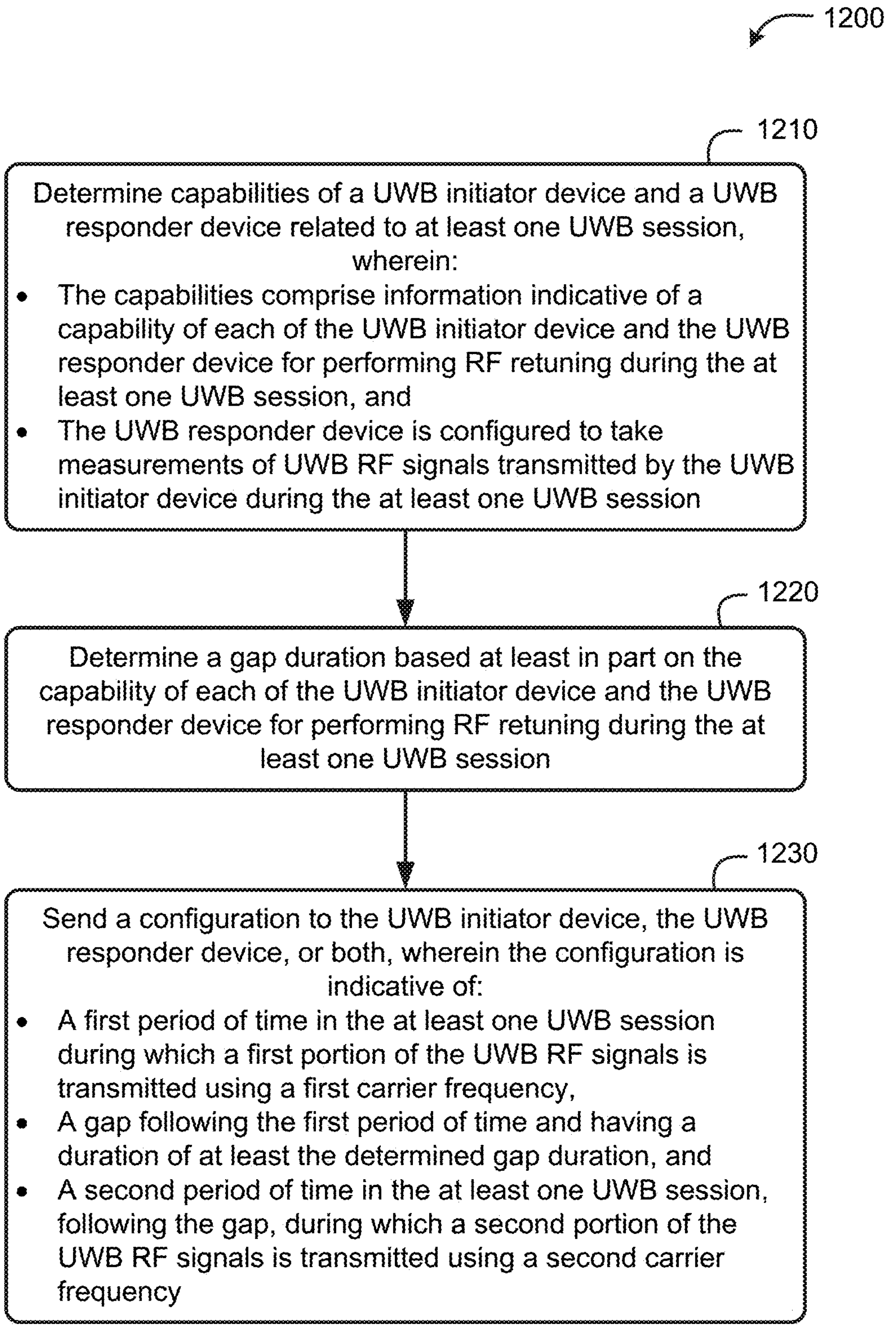
FIG. 12 is a flow diagram of a method of enabling frequency stitching in either or both UWB ranging or sensing, according to an embodiment.
Figure 13:
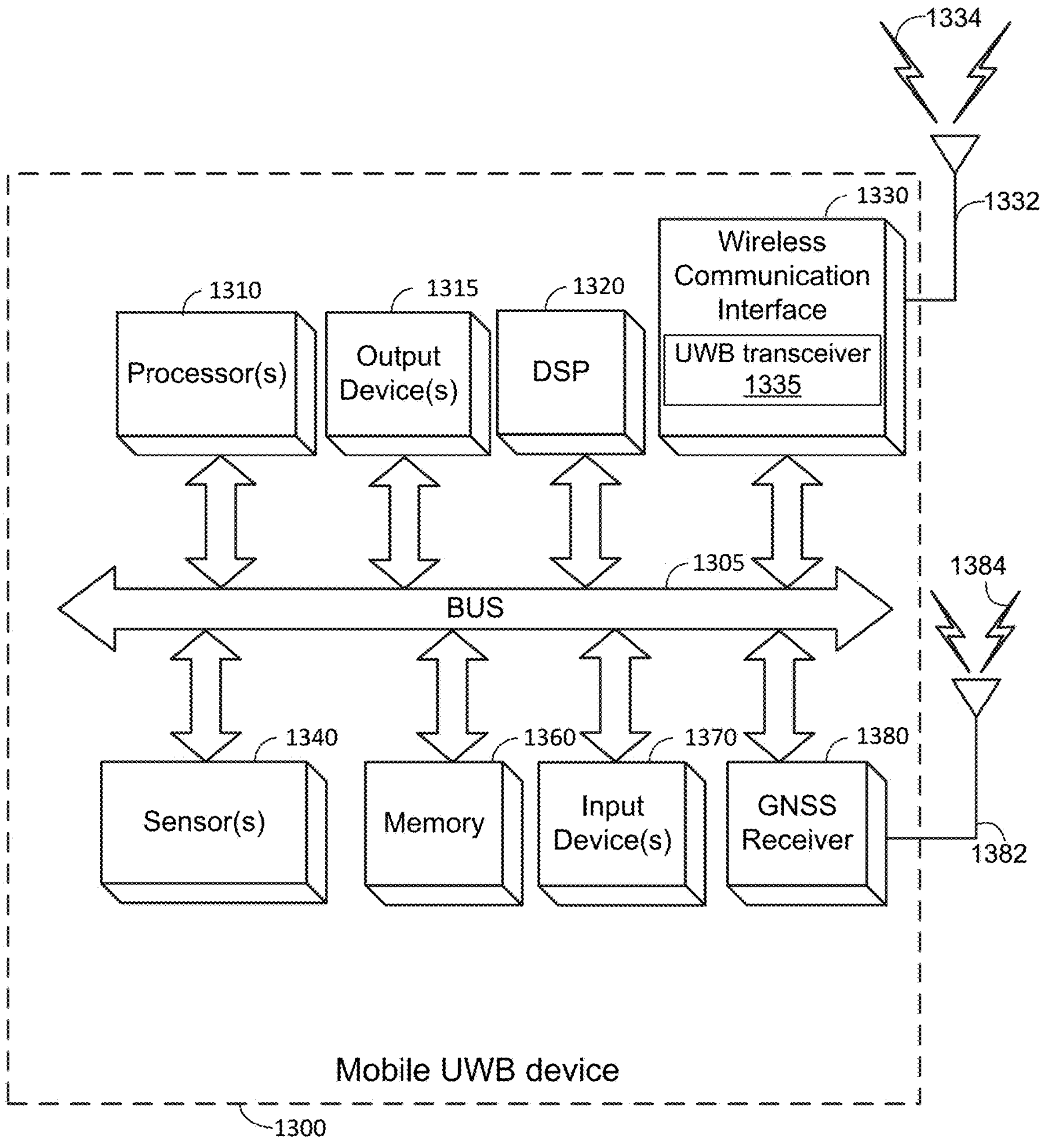
FIG. 13 is a block diagram of an embodiment of a mobile UWB device, which can be utilized in embodiments as described herein.
Figure 14:
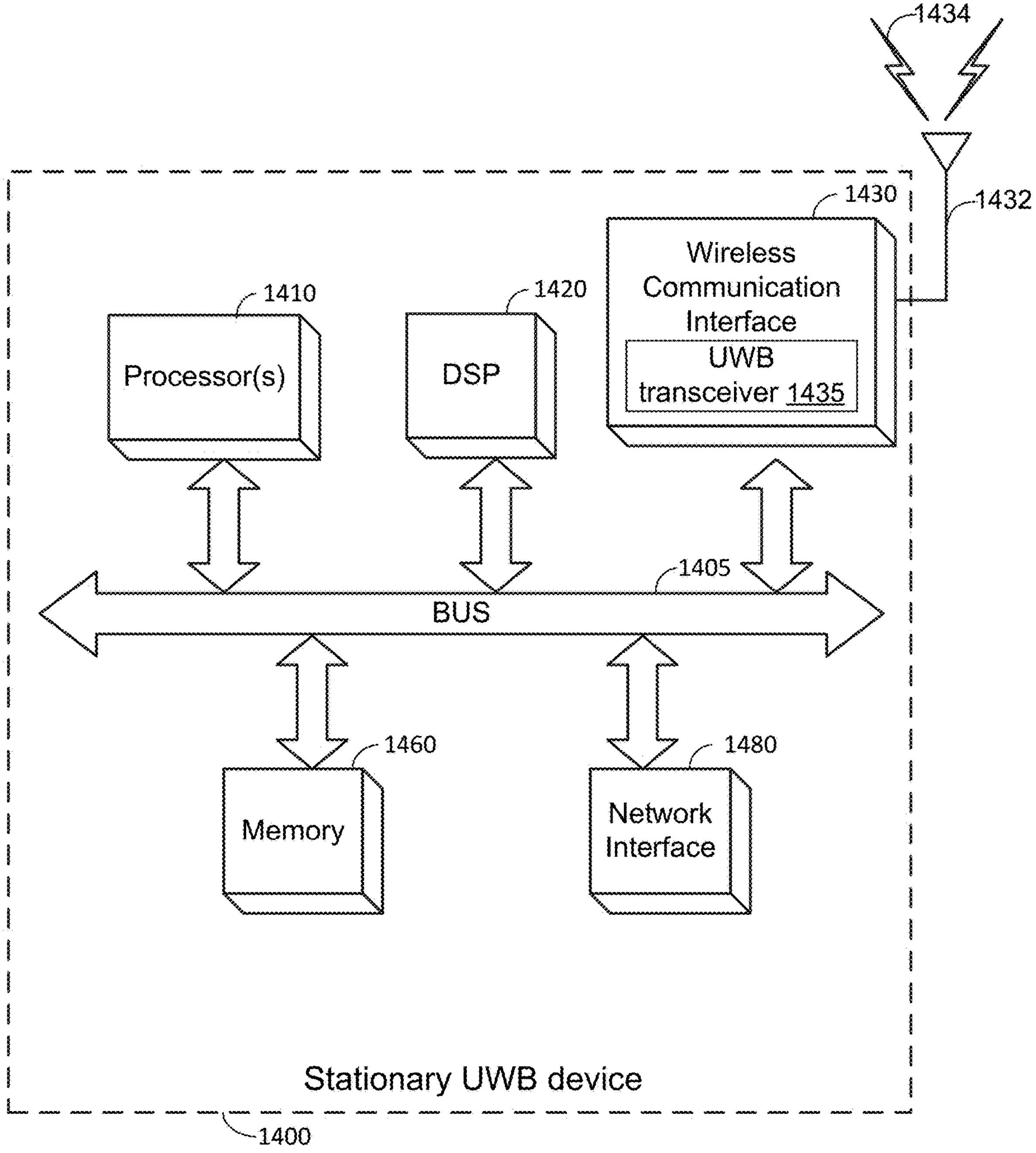
FIG. 14 is a block diagram of an embodiment of a stationary UWB device, which can be utilized in embodiments as described herein.
Figure 15:
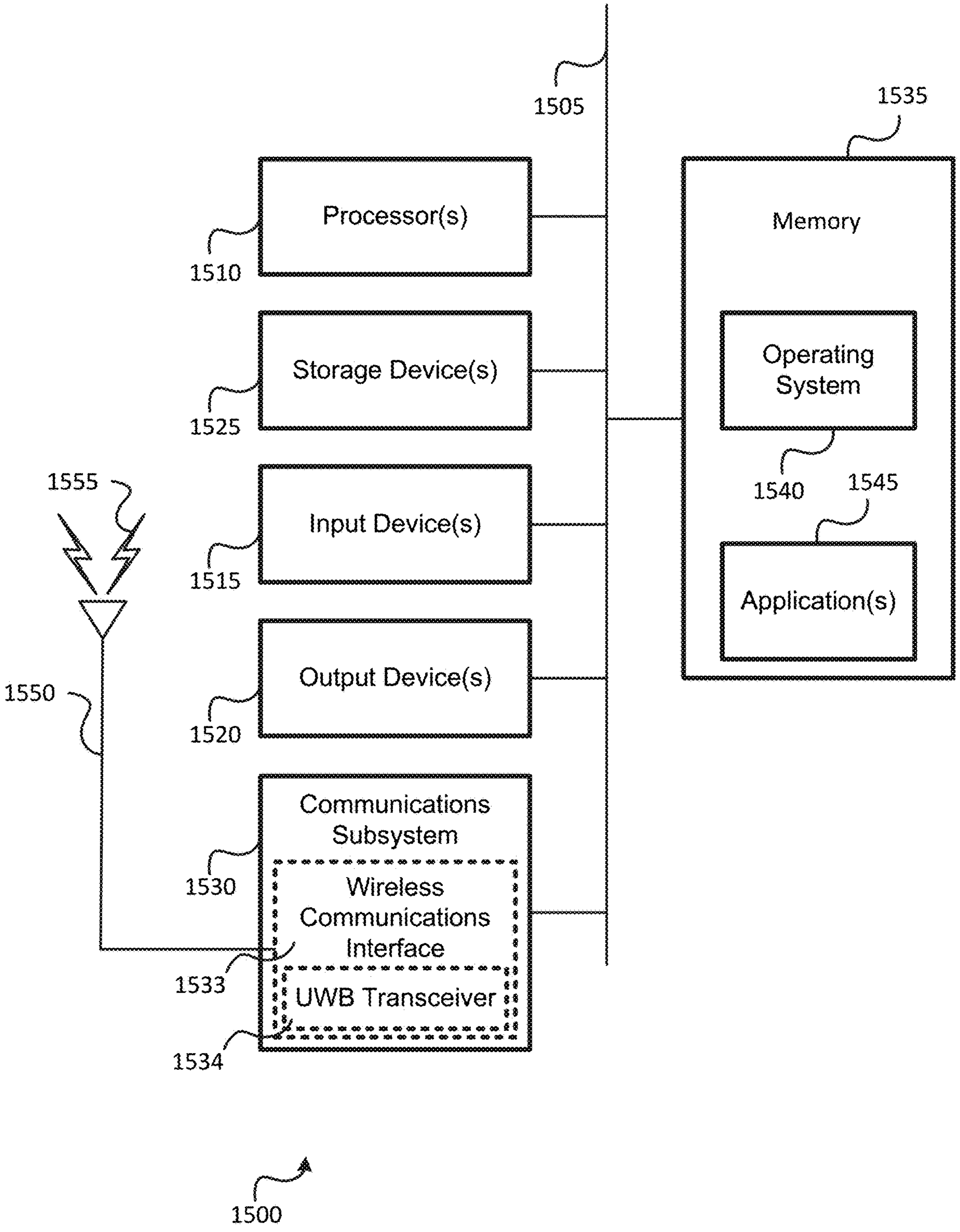
FIG. 15 is a block diagram of an embodiment of a computer system, which can be utilized in embodiments as described herein.

FIG. 12 is a flow diagram of a method 1200 of enabling frequency stitching in either or both UWB ranging or sensing, according to an embodiment. Means for performing the functionality illustrated in one or more of the blocks shown in FIG. 12 may be performed by hardware and/or software components of a configuring device, which may be a UWB device (e.g., controller and/or initiator UWB) or a server communicatively coupled with initiator and responder UWB devices. Example components of UWB devices are illustrated in FIGS. 13 and 14, and example components of a computer system that may operate as a server are illustrated in FIG. 15. FIGS. 13-15 are described in more detail below.

At block 1210, the functionality comprises determining capabilities of a UWB initiator device and a UWB responder device related to at least one UWB session, wherein: the capabilities comprise information indicative of a capability of each of the UWB initiator device and the UWB responder device for performing RF retuning during the at least one UWB session, and the UWB responder device is configured to take measurements of UWB RF signals transmitted by the UWB initiator device during the at least one UWB session. As noted in the embodiments above, the capability of each of the UWB initiator device and the UWB responder device for performing RF retuning during the at least one UWB session may comprise an RF tuning resolution, a time required for performing the RF retuning, or both. In some embodiments, RF tuning resolution, the time required for performing the RF retuning, or both, may be negotiated and agreed upon between the UWB initiator device and the UWB responder device before the start of the at least one UWB session.

Means for performing functionality at block 1210 may comprise a bus 1305, one or more processors 1310, a digital signal processor (DSP) 1320, a wireless communication interface 1330, a memory 1360, and/or other components of a mobile UWB device 1300, as illustrated in FIG. 13. Means for performing functionality at block 1210 may comprise a bus 1405, one or more processors 1410, a DSP 1420, a wireless communication interface 1430, a memory 1460, and/or other components of a stationary UWB device 1400, as illustrated in FIG. 14. Means for performing functionality at block 1210 may comprise a bus 1505, one or more processors 1510, one or more input devices 1520, a communications subsystem 1530 (which may include wireless communication interface 1533), memory 1535 (which may include an operating system 1540 and/or one or more applications 1545), and/or other components of a computer system 1500, as illustrated in FIG. 15.

At block 1220, the functionality comprises determining a gap duration based at least in part on the capability of each of the UWB initiator device and the UWB responder device for performing RF retuning during the at least one UWB session. Means for performing functionality at block 1220 may comprise a bus 1305, one or more processors 1310, a DSP 1320, a wireless communication interface 1330, a memory 1360, and/or other components of a mobile UWB device 1300, as illustrated in FIG. 13. Means for performing functionality at block 1220 may comprise a bus 1405, one or more processors 1410, a DSP 1420, a wireless communication interface 1430, a memory 1460, and/or other components of a stationary UWB device 1400, as illustrated in FIG. 14. Means for performing functionality at block 1220 may comprise a bus 1505, one or more processors 1510, one or more input devices 1520, a communications subsystem 1530 (which may include wireless communication interface 1533), memory 1535 (which may include an operating system 1540 and/or one or more applications 1545), and/or other components of a computer system 1500, as illustrated in FIG. 15.

At block 1230, the functionality comprises sending a configuration to the UWB initiator device, the UWB responder device, or both, wherein the configuration is indicative of: a first period of time in the at least one UWB session during which a first portion of the UWB RF signals is transmitted using a first carrier frequency, a gap following the first period of time and having a duration of at least the determined gap duration, and a second period of time in the at least one UWB session, following the gap, during which a second portion of the UWB RF signals is transmitted using a second carrier frequency. In some embodiments the configuration may be further indicative of one or more additional periods of time in the at least one UWB session subsequent to the second period of time, in addition to the first period of time and the second period of time, during which a one or more respective additional portions of the UWB RF signals is transmitted, wherein: each of the one or more additional periods of time is preceded by an additional gap having at least the determined gap duration, and each of the one or more respective additional portions of the UWB RF signals is transmitted using a different carrier frequency. In such embodiments, the one or more respective additional portions of the UWB RF signals may comprise a third portion of the UWB RF signals transmitted using a third carrier frequency, and wherein a bandwidth of the first portion of the UWB RF signals overlaps with a bandwidth of the second portion of the UWB RF signals by a first amount, and a bandwidth of the second portion of the UWB RF signals overlaps with a bandwidth of the third portion of the UWB RF signals by a second amount different than the first amount.

Means for performing functionality at block 1230 may comprise a bus 1305, one or more processors 1310, a DSP 1320, a wireless communication interface 1330, a memory 1360, and/or other components of a mobile UWB device 1300, as illustrated in FIG. 13. Means for performing functionality at block 1230 may comprise a bus 1405, one or more processors 1410, a DSP 1420, a wireless communication interface 1430, a memory 1460, and/or other components of a stationary UWB device 1400, as illustrated in FIG. 14. Means for performing functionality at block 1230 may comprise a bus 1505, one or more processors 1510, one or more input devices 1520, a communications subsystem 1530 (which may include wireless communication interface 1533), memory 1535 (which may include an operating system 1540 and/or one or more applications 1545), and/or other components of a computer system 1500, as illustrated in FIG. 15.

Variations to method 1200 may be implemented in some embodiments, which may depend on which device is performing the method 1200. For example, in some embodiments, the method may be performed by the UWB initiator device, and wherein determining the capabilities of the UWB responder device may comprise receiving, at the UWB initiator device, capability information via a control message from the UWB responder device, and sending the configuration may comprise sending the configuration in a configuration message from the UWB initiator device to the UWB responder device. In some embodiments, the method may be performed by the UWB responder device, and wherein determining the capabilities of the UWB initiator device may comprise receiving, at the UWB responder device, capability information via a control message from the UWB initiator device, and sending the configuration may comprise sending the configuration in a configuration message from the UWB responder device to the UWB initiator device. In some embodiments, the method may be performed by a server communicatively coupled with the UWB responder device and the UWB initiator device.

Some embodiments may include one or more of the following additional operations to the method 1200. The first period of time, the gap, and the second period of time may all occur within a single slot of a single UWB session of the at least one UWB session. The first portion of the UWB RF signals may comprise a first segment of a Scrambled Timestamp Sequence (STS) or SENS sequence, and the second portion of the UWB RF signal comprises a second segment of the STS or SENS sequence. The first period of time may occur within a first slot of a single UWB session of the at least one UWB session, and the second period of time may occur in a second slot of the single UWB session immediately following the first slot. In such embodiments, the gap may occur during the first slot, or during a Tx offset of the second slot. A combination of at least two UWB sessions may comprise a first UWB session and at least a second UWB session following the first UWB session by a time offset, transmission at the first carrier frequency may occur within a slot of the first UWB session having a particular slot index, transmission at the second carrier frequency may occur within a slot of the second UWB session having the particular slot index, transmissions at each of the next carrier frequencies may occur within associated slots of the next UWB sessions having the particular slot index, and the duration of the time offsets between UWB sessions may be such that the slot of the second UWB session occurs after the slot of the first UWB session, similarly for the offset of next slots. In some embodiments, a combination of at least two UWB sessions may comprise a first UWB session and at least a second UWB session substantially aligned in time with the first UWB session, transmission at the first carrier frequency may occur within a slot of the first UWB session having a first slot index, transmission at the second carrier frequency may occur within a slot of the second UWB session having a second slot index different than the first slot index, and the second slot index may be such that the slot of the second UWB session occurs after the slot of the first UWB session. In some embodiments, this can be extended to more than two periods. In some embodiments, a combination of at least two UWB sessions may comprise a first UWB session and a second UWB session substantially aligned in time with the first UWB session, transmission at the first carrier frequency may occur within a slot of a first round the first UWB session, the slot having a particular slot index, and transmission at the second carrier frequency may occur within a slot of a second round of the second UWB session, the slot having the particular slot index. Again, this can be extended to more than two periods.

FIG. 13 is a block diagram of an embodiment of a mobile UWB device 1300, which can be utilized as described herein above. It should be noted that FIG. 13 is meant only to provide a generalized illustration of various components, any or all of which may be utilized as appropriate. For example, more basic/simple types of UWB devices may omit various components that may be included in more advanced/complex UWB devices. Furthermore, as previously noted, the functionality of the UE discussed in the previously described embodiments may be executed by one or more of the hardware and/or software components illustrated in FIG. 13.

The mobile UWB device 1300 is shown comprising hardware elements that can be electrically coupled via a bus 1305 (or may otherwise be in communication, as appropriate). The hardware elements may include a processor(s) 1310 which can include without limitation one or more general-purpose processors (e.g., an application processor), one or more special-purpose processors (such as digital signal processor (DSP) chips, graphics acceleration processors, application specific integrated circuits (ASICs), and/or the like), and/or other processing structures or means. Processor(s) 1310 may comprise one or more processing units, which may be housed in a single integrated circuit (IC) or multiple ICs. As shown in FIG. 13, some embodiments may have a separate DSP 1320, depending on desired functionality. Location determination and/or other determinations based on wireless communication may be provided in the processor(s) 1310 and/or wireless communication interface 1330 (discussed below). The mobile UWB device 1300 also can include one or more input devices 1370, which can include without limitation one or more keyboards, touch screens, touch pads, microphones, buttons, dials, switches, and/or the like; and one or more output devices 1315, which can include without limitation one or more displays (e.g., touch screens), light emitting diodes (LEDs), speakers, and/or the like.

The mobile UWB device 1300 may also include a wireless communication interface 1330, which may comprise without limitation a modem, a network card, an infrared communication device, a wireless communication device, and/or a chipset (such as a Bluetooth® device, an IEEE 802.11 device, an IEEE 802.15.4 device, a Wi-Fi device, a WiMAX device, a WAN device, and/or various cellular devices, etc.), and/or the like, which may enable the mobile UWB device 1300 to communicate with other devices as described in the embodiments above. The wireless communication interface 1330 may permit data and signaling to be communicated (e.g., transmitted and received) with access points, various base stations and/or other access node types, and/or other network components, computer systems, and/or any other electronic devices communicatively coupled therewith. The communication can be carried out via one or more wireless communication antenna(s) 1332 that send and/or receive wireless signals 1334. According to some embodiments, the wireless communication antenna(s) 1332 may comprise a plurality of discrete antennas, antenna arrays, or any combination thereof. The antenna(s) 1332 may be capable of transmitting and receiving wireless signals using beams (e.g., Tx beams and Rx beams). Beam formation may be performed using digital and/or analog beam formation techniques, with respective digital and/or analog circuitry. The wireless communication interface 1330 may include such circuitry.

As illustrated, the wireless indication interface 1330 may further comprise a UWB transceiver 1335. The UWB transceiver 1335 may be operated to perform the UWB operations described herein. Further, the wireless communications interface 1330 may comprise one or more additional communication technologies with which the OOB functionalities described herein may be performed. According to some embodiments, the UWB transceiver 1335 may be one of a plurality of UWB transceivers of the mobile UWB device 1300. Further, the UWB transceiver may be used for functionality in addition to the UWB positioning functionality described herein. Although illustrated as part of the wireless communication interface 1330, the UWB transceiver 1335 may be separate from the wireless communication interface 1330 in some embodiments.

Depending on desired functionality, the wireless communication interface 1330 may comprise a separate receiver and transmitter, or any combination of transceivers, transmitters, and/or receivers to communicate with base stations (e.g., ng-eNBs and gNBs) and other terrestrial transceivers, such as wireless devices and access points. The mobile UWB device 1300 may communicate with different data networks that may comprise various network types. For example, a Wireless Wide Area Network (WWAN) may be a CDMA network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMAX (IEEE 802.16) network, and so on. A CDMA network may implement one or more RATs such as CDMA2000®, WCDMA, and so on. CDMA2000® includes IS-95, IS-2000 and/or IS-856 standards. A TDMA network may implement GSM, Digital Advanced Mobile Phone System (D-AMPS), or some other RAT. An OFDMA network may employ LTE, LTE Advanced, 5G NR, and so on. 5G NR, LTE, LTE Advanced, GSM, and WCDMA are described in documents from 3GPP. CDMA2000® is described in documents from a consortium named "3rd Generation Partnership Project 2" (3GPP2). 3GPP and 3GPP2 documents are publicly available. A wireless local area network (WLAN) may also be an IEEE 802.11x network, and a wireless personal area network (WPAN) may be a Bluetooth network, an IEEE 802.15x, or some other type of network. The techniques described herein may also be used for any combination of WWAN, WLAN and/or WPAN.

The mobile UWB device 1300 can further include sensor(s) 1340. Sensor(s) 1340 may comprise, without limitation, one or more inertial sensors and/or other sensors (e.g., accelerometer(s), gyroscope(s), camera(s), magnetometer(s), altimeter(s), microphone(s), proximity sensor(s), light sensor(s), barometer(s), and the like), some of which may be used to obtain position-related measurements and/or other information.

Embodiments of the mobile UWB device 1300 may also include a Global Navigation Satellite System (GNSS) receiver 1380 capable of receiving signals 1384 from one or more GNSS satellites using an antenna 1382 (which could be the same as antenna 1332). Positioning based on GNSS signal measurement can be utilized to complement and/or incorporate the techniques described herein. The GNSS receiver 1380 can extract the position of the mobile UWB device 1300, using conventional techniques, from GNSS satellites of a GNSS system, such as Global Positioning System (GPS), Galileo, GLONASS, Quasi-Zenith Satellite System (QZSS) over Japan, IRNSS over India, BeiDou Navigation Satellite System (BDS) over China, and/or the like. Moreover, the GNSS receiver 1380 can be used with various storage devices, a solid-state storage device, such as a random access memory (RAM), and/or a read-only memory (ROM), which can be programmable, flash-updateable, and/or the like. Such storage devices may be configured to implement any appropriate data stores, including without limitation, various file systems, database structures, and/or the like.

The memory 1360 of the mobile UWB device 1300 also can comprise software elements (not shown in FIG. 13), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions in memory 1360 that are executable by the mobile UWB device 1300 (and/or processor(s) 1310 or DSP 1320 within mobile UWB device 1300). In some embodiments, then, such code and/or instructions can be used to configure and/or adapt a general-purpose computer (or another device) to perform one or more operations in accordance with the described methods.

FIG. 14 is a block diagram of an embodiment of a stationary UWB device 1400, which can be utilized as described herein above (e.g., in association with FIGS. 1-13). It should be noted that FIG. 14 is meant only to provide a generalized illustration of various components, any or all of which may be utilized as appropriate. In some embodiments, the UWB anchor 1400 may correspond to an anchor UWB having a known location, which may be used to determine the location of other UWB devices, including mobile UWB devices. According to some embodiments, the stationary UWB device 1400 may be permanently stationary or temporarily stationary. A stationary UWB device 1400 with a known location may serve, for example, as a UWB anchor to assist in the positioning of other UWB devices and/or perform sensing of nearby objects.

The stationary UWB device 1400 is shown comprising hardware elements that can be electrically coupled via a bus 1405 (or may otherwise be in communication, as appropriate). The hardware elements may include a processor(s) 1410 which can include without limitation one or more general-purpose processors, one or more special-purpose processors (such as DSP chips, graphics acceleration processors, ASICs, and/or the like), and/or other processing structure or means. As shown in FIG. 14, some embodiments may have a separate DSP 1420, depending on desired functionality. Location determination and/or other determinations based on wireless communication may be provided in the processor(s) 1410 and/or wireless communication interface 1430 (discussed below), according to some embodiments. The stationary UWB device 1400 also can include one or more input devices, which can include without limitation a keyboard, display, mouse, microphone, button(s), dial(s), switch(es), and/or the like; and one or more output devices, which can include without limitation a display, light emitting diode (LED), speakers, and/or the like.

The stationary UWB device 1400 might also include a wireless communication interface 1430, which may comprise without limitation a modem, a network card, an infrared communication device, a wireless communication device, and/or a chipset (such as a Bluetooth® device, an IEEE 802.11 device, an IEEE 802.15.4 device, a Wi-Fi device, a WiMAX device, cellular communication facilities, etc.), and/or the like, which may enable the stationary UWB device 1400 to communicate as described herein. The wireless communication interface 1430 may permit data and signaling to be communicated (e.g., transmitted and received) to UEs, other base stations/TRPs (e.g., eNBs, gNBs, and ng-eNBs), and/or other network components, computer systems, and/or any other electronic devices described herein. The communication can be carried out via one or more wireless communication antenna(s) 1432 that send and/or receive wireless signals 1434.

As illustrated, the wireless indication interface 1430 may further comprise a UWB transceiver 1435. The UWB transceiver 1435 may be operated to perform the UWB operations described herein. Further, the wireless communications interface 1430 may comprise one or more additional communication technologies with which the OOB functionalities described herein may be performed. According to some embodiments, the UWB transceiver 1435 may be one of a plurality of UWB transceivers of the mobile UWB device 1400. Further, the UWB transceiver may be used for functionality in addition to the UWB positioning functionality described herein. Although illustrated as part of the wireless communication interface 1430, the UWB transceiver 1435 may be separate from the wireless communication interface 1430 in some embodiments.

The stationary UWB device 1400 may also include a network interface 1480, which can include support of wireline communication technologies. The network interface 1480 may include a modem, network card, chipset, and/or the like. The network interface 1480 may include one or more input and/or output communication interfaces to permit data to be exchanged with a network, communication network servers, computer systems, and/or any other electronic devices described herein. In some embodiments, the stationary UWB device 1400 may be communicatively coupled with one or more servers and/or other stationary UWB devices via the network interface 1480.

In many embodiments, the stationary UWB device 1400 may further comprise a memory 1460. The memory 1460 can include, without limitation, local and/or network accessible storage, a disk drive, a drive array, an optical storage device, a solid-state storage device, such as a RAM, and/or a ROM, which can be programmable, flash-updateable, and/or the like. Such storage devices may be configured to implement any appropriate data stores, including without limitation, various file systems, database structures, and/or the like.

The memory 1460 of the stationary UWB device 1400 also may comprise software elements (not shown in FIG. 14), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions in memory 1460 that are executable by the stationary UWB device 1400 (and/or processor(s) 1410 or DSP 1420 within stationary UWB device 1400). In some embodiments, then, such code and/or instructions can be used to configure and/or adapt a general-purpose computer (or other device) to perform one or more operations in accordance with the described methods.

FIG. 15 is a block diagram of an embodiment of a computer system 1500, which may be used, in whole or in part, to provide the functions of a server as described in the embodiments herein. For example, as noted, a server may function as a configuring device, in some embodiments. It should be noted that FIG. 15 is meant only to provide a generalized illustration of various components, any or all of which may be utilized as appropriate. FIG. 15, therefore, broadly illustrates how individual system elements may be implemented in a relatively separated or relatively more integrated manner. In addition, it can be noted that components illustrated by FIG. 15 can be localized to a single device and/or distributed among various networked devices, which may be disposed at different geographical locations.

The computer system 1500 is shown comprising hardware elements that can be electrically coupled via a bus 1505 (or may otherwise be in communication, as appropriate). The hardware elements may include processor(s) 1510, which may comprise without limitation one or more general-purpose processors, one or more special-purpose processors (such as digital signal processing chips, graphics acceleration processors, and/or the like), and/or other processing structure, which can be configured to perform one or more of the methods described herein. The computer system 1500 also may comprise one or more input devices 1515, which may comprise without limitation a mouse, a keyboard, a camera, a microphone, and/or the like; and one or more output devices 1520, which may comprise without limitation a display device, a printer, and/or the like.

The computer system 1500 may further include (and/or be in communication with) one or more non-transitory storage devices 1525, which can comprise, without limitation, local and/or network accessible storage, and/or may comprise, without limitation, a disk drive, a drive array, an optical storage device, a solid-state storage device, such as a RAM and/or ROM, which can be programmable, flash-updateable, and/or the like. Such storage devices may be configured to implement any appropriate data stores, including without limitation, various file systems, database structures, and/or the like. Such data stores may include database(s) and/or other data structures used store and administer messages and/or other information to be sent to one or more devices via hubs, as described herein.

The computer system 1500 may also include a communications subsystem 1530, which may (optionally, as indicated by dotted lines) comprise wireless communication technologies managed and controlled by a wireless communication interface 1533, as well as wired technologies (such as Ethernet, coaxial communications, universal serial bus (USB), and the like). The wireless communication interface 1533 may comprise one or more wireless transceivers that may send and receive wireless signals 1555 (e.g., signals according to 5G NR or LTE) via wireless antenna(s) 1550. Optionally, these one or more wireless transceivers may comprise a UWB transceiver 1534. Thus the communications subsystem 1530 may comprise a modem, a network card (wireless or wired), an infrared communication device, a wireless communication device, and/or a chipset, and/or the like, which may enable the computer system 1500 to communicate on any or all of the communication networks described herein to any device on the respective network.

Hence, the communications subsystem 1530 may be used to receive and send data as described in the embodiments herein.

In many embodiments, the computer system 1500 will further comprise a working memory 1535, which may comprise a RAM or ROM device, as described above. Software elements, shown as being located within the working memory 1535, may comprise an operating system 1540, device drivers, executable libraries, and/or other code, such as one or more applications 1545, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general-purpose computer (or another device) to perform one or more operations in accordance with the described methods.

A set of these instructions and/or code might be stored on a non-transitory computer-readable storage medium, such as the storage device(s) 1525 described above. In some cases, the storage medium might be incorporated within a computer system, such as computer system 1500. In other embodiments, the storage medium might be separate from a computer system (e.g., a removable medium, such as an optical disc), and/or provided in an installation package, such that the storage medium can be used to program, configure, and/or adapt a general purpose computer with the instructions/code stored thereon. These instructions might take the form of executable code, which is executable by the computer system 1500 and/or might take the form of source and/or installable code, which, upon compilation and/or installation on the computer system 1500 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processors and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media and volatile media. Common forms of computer-readable media include, for example, magnetic and/or optical media, any other physical medium with patterns of holes, a RAM, a programmable ROM (PROM), erasable PROM (EPROM), a FLASH-EPROM, any other memory chip or cartridge, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus many of the elements are examples that do not limit the scope of the disclosure to those specific examples.

It has proven convenient at times, principally for reasons of common usage, to refer to such signals as bits, information, values, elements, symbols, characters, variables, term, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussion utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several embodiments, various modifications, alternative constructions, and equivalents may be used without departing from the scope of the disclosure. For example, the above elements may merely be a component of a larger system, wherein other rules may take precedence over or otherwise modify the application of the various embodiments. Also, a number of steps may be undertaken before, during, or after the above elements are considered. Accordingly, the above description does not limit the scope of the disclosure.

In view of this description embodiments may include different combinations of features. Implementation examples are described in the following numbered clauses:

Clause 1. A method of enabling frequency stitching in ultra-wideband (UWB) ranging and/or sensing, the method comprising: determining capabilities of a UWB initiator device and a UWB responder device related to at least one UWB session, wherein: the capabilities comprise information indicative of a capability of each of the UWB initiator device and the UWB responder device for performing radio frequency (RF) retuning during the at least one UWB session, and the UWB responder device is configured to take measurements of UWB RF signals transmitted by the UWB initiator device during the at least one UWB session; determining a gap duration based at least in part on the capability of each of the UWB initiator device and the UWB responder device for performing RF retuning during the at least one UWB session; and sending a configuration to the UWB initiator device, the UWB responder device, or both, wherein the configuration is indicative of: a first period of time in the at least one UWB session during which a first portion of the UWB RF signals is transmitted using a first carrier frequency, a gap following the first period of time and having a duration of at least the determined gap duration, and a second period of time in the at least one UWB session, following the gap, during which a second portion of the UWB RF signals is transmitted using a second carrier frequency.

Clause 2. The method of clause 1, wherein the configuration is further indicative of one or more additional periods of time in the at least one UWB session subsequent to the second period of time, in addition to the first period of time and the second period of time, during which a one or more respective additional portions of the UWB RF signals is transmitted, wherein: each of the one or more additional periods of time is preceded by an additional gap having at least the determined gap duration, and each of the one or more respective additional portions of the UWB RF signals is transmitted using a different carrier frequency.

Clause 3. The method of clause 2 wherein the one or more respective additional portions of the UWB RF signals comprises a third portion of the UWB RF signals transmitted using a third carrier frequency, and wherein: a bandwidth of the first portion of the UWB RF signals overlaps with a bandwidth of the second portion of the UWB RF signals by a first amount, and a bandwidth of the second portion of the UWB RF signals overlaps with a bandwidth of the third portion of the UWB RF signals by a second amount different than the first amount.

Clause 4. The method of any of clauses 1-3 wherein the capability of each of the UWB initiator device and the UWB responder device for performing RF retuning during: an RF tuning resolution, a time required for performing the RF retuning, or both.

Clause 5. The method of clause 4 wherein the RF tuning resolution, the time required for performing the RF retuning, or both, are negotiated and agreed upon between the UWB initiator device and the UWB responder device before the at least one UWB session starts.

Clause 6. The method of any of clauses 1-5 wherein the method is performed by the UWB initiator device, and wherein: determining the capabilities of the UWB responder device comprises receiving, at the UWB initiator device, capability information via a control message from the UWB responder device, and sending the configuration comprises sending the configuration in a configuration message from the UWB initiator device to the UWB responder device.

Clause 7. The method of any of clauses 1-5 wherein the method is performed by the UWB responder device, and wherein: determining the capabilities of the UWB initiator device comprises receiving, at the UWB responder device, capability information via a control message from the UWB initiator device, and sending the configuration comprises sending the configuration in a configuration message from the UWB responder device to the UWB initiator device.

Clause 8. The method of any of clauses 1-5 wherein the method is performed by a server communicatively coupled with the UWB responder device and the UWB initiator device.

Clause 9. The method of any of clauses 1-8 wherein the first period of time, the gap, and the second period of time all occur within a single slot of a single UWB session of the at least one UWB session.

Clause 10. The method of clause 9 wherein the first portion of the UWB RF signals comprises a first segment of a Scrambled Timestamp Sequence (STS) or SENS sequence, and the second portion of the UWB RF signal comprises a second segment of the STS or SENS sequence.

Clause 11. The method of any of clauses 1-8 wherein the first period of time occurs within a first slot of a single UWB session of the at least one UWB session, and the second period of time occurs in a second slot of the single UWB session immediately following the first slot.

Clause 12. The method of clause 11 wherein the gap occurs during the first slot.

Clause 13. The method of clause 11 wherein the gap occurs during a Tx offset of the second slot.

Clause 14. The method of any of clauses 1-8 wherein a combination of at least two UWB sessions comprise a first UWB session and at least a second UWB session following the first UWB session by a time offset; transmission at the first carrier frequency occurs within a slot of the first UWB session having a particular slot index; transmission at the second carrier frequency occurs within a slot of the second UWB session having the particular slot index; similarly transmissions at each of the next carrier frequencies occur within associated slots of the next UWB sessions having the particular slot index; the duration of the time offsets between UWB sessions are such that the slot of the second UWB session occurs after the slot of the first UWB session, similarly for the offset of next slots.

Clause 15. The method of any of clauses 1-8 wherein a combination of at least two UWB sessions comprise a first UWB session and at least a second UWB session substantially aligned in time with the first UWB session; transmission at the first carrier frequency occurs within a slot of the first UWB session having a first slot index; transmission at the second carrier frequency occurs within a slot of the second UWB session having a second slot index different than the first slot index; and the second slot index is such that the slot of the second UWB session occurs after the slot of the first UWB session. Similarly this can be extended to more than two periods.

Clause 16. The method of any of clauses 1-8 wherein a combination of at least two UWB sessions comprise a first UWB session and a second UWB session substantially aligned in time with the first UWB session; transmission at the first carrier frequency occurs within a slot of a first round the first UWB session, the slot having a particular slot index; and transmission at the second carrier frequency occurs within a slot of a second round of the second UWB session, the slot having the particular slot index. Similarly this can be extended to more than two periods.

Clause 17. A mobile device comprising: a UWB transceiver; a memory; and one or more processors communicatively coupled with the UWB transceiver and the memory, and wherein the one or more processors are configured to perform the method of any of clauses 1-16.

Clause 18. A device comprising means for performing the method of any of clauses 1-16.

Clause 19. A non-transitory computer-readable medium having instructions embedded thereon, which, when executed by one or more processors, cause the one or more processors to perform the method of any of clauses 1-16.

What is claimed is:

1. A method of enabling frequency stitching in either or both of ultra-wideband (UWB) ranging or sensing, the method comprising:

determining capabilities of a UWB initiator device and a UWB responder device related to at least one UWB session, wherein:

the capabilities comprise information indicative of a capability of each of the UWB initiator device and the UWB responder device for performing radio frequency (RF) retuning during the at least one UWB session, and the UWB responder device is configured to take measurements of UWB RF signals transmitted by the UWB initiator device during the at least one UWB session;

determining a gap duration based at least in part on the capability of each of the UWB initiator device and the UWB responder device for performing RF retuning during the at least one UWB session; and sending a configuration to the UWB initiator device, the UWB responder device, or both, wherein the configuration is indicative of:

a first period of time in the at least one UWB session during which a first portion of the UWB RF signals is transmitted using a first carrier frequency, a gap following the first period of time and having a duration of at least the determined gap duration, and a second period of time in the at least one UWB session, following the gap, during which a second portion of the UWB RF signals is transmitted using a second carrier frequency.

2. The method of claim 1, wherein the configuration is further indicative of one or more additional periods of time in the at least one UWB session subsequent to the second period of time, in addition to the first period of time and the second period of time, during which a one or more respective additional portions of the UWB RF signals is transmitted, wherein:

each of the one or more additional periods of time is preceded by an additional gap having at least the determined gap duration, and each of the one or more respective additional portions of the UWB RF signals is transmitted using a different carrier frequency.

3. The method of claim 2, wherein the one or more respective additional portions of the UWB RF signals comprises a third portion of the UWB RF signals transmitted using a third carrier frequency, and wherein:

a bandwidth of the first portion of the UWB RF signals overlaps with a bandwidth of the second portion of the UWB RF signals by a first amount, and a bandwidth of the second portion of the UWB RF signals overlaps with a bandwidth of the third portion of the UWB RF signals by a second amount different than the first amount.

4. The method of claim 1, wherein the capability of each of the UWB initiator device and the UWB responder device for performing RF retuning during the at least one UWB session comprises:

an RF tuning resolution, a time required for performing the RF retuning, or both.

5. The method of claim 4, wherein the RF tuning resolution, the time required for performing the RF retuning, or both, are negotiated and agreed upon between the UWB initiator device and the UWB responder device before the at least one UWB session starts.

6. The method of claim 1, wherein the method is performed by the UWB initiator device, and wherein:

determining the capabilities of the UWB responder device comprises receiving, at the UWB initiator device, capability information via a control message from the UWB responder device, and sending the configuration comprises sending the configuration in a configuration message from the UWB initiator device to the UWB responder device.

7. The method of claim 1, wherein the method is performed by the UWB responder device, and wherein:

determining the capabilities of the UWB initiator device comprises receiving, at the UWB responder device, capability information via a control message from the UWB initiator device, and sending the configuration comprises sending the configuration in a configuration message from the UWB responder device to the UWB initiator device.

8. The method of claim 1, wherein the method is performed by a server communicatively coupled with the UWB responder device and the UWB initiator device.

9. The method of claim 1, wherein the first period of time, the gap, and the second period of time are each contained sequentially within a single slot of a single UWB session of the at least one UWB session.

10. The method of claim 9, wherein:

the first portion of the UWB RF signals comprises a first segment of a Scrambled Timestamp Sequence (STS) or SENS sequence, and the second portion of the UWB RF signal comprises a second segment of the STS or SENS sequence.

11. The method of claim 1, wherein the first period of time occurs within a first slot of a single UWB session of the at least one UWB session, and the second period of time occurs in a second slot of the single UWB session immediately following the first slot.

12. The method of claim 11, wherein the gap occurs during the first slot or during a Tx offset of the second slot.

13. The method of claim 1, wherein:

a combination of at least two UWB sessions comprise a first UWB session and at least a second UWB session following the first UWB session by a time offset;

transmission at the first carrier frequency occurs within a slot of the first UWB session having a particular slot index;

transmission at the second carrier frequency occurs within a slot of the second UWB session having the particular slot index;

transmissions at each of the next carrier frequencies occur within associated slots of the next UWB sessions having the particular slot index; and the duration of the time offsets between UWB sessions are such that the slot of the second UWB session occurs after the slot of the first UWB session.

14. The method of claim 1, wherein:

a combination of at least two UWB sessions comprise a first UWB session and at least a second UWB session substantially aligned in time with the first UWB session;

transmission at the first carrier frequency occurs within a slot of the first UWB session having a first slot index;

transmission at the second carrier frequency occurs within a slot of the second UWB session having a second slot index different than the first slot index; and the second slot index is such that the slot of the second UWB session occurs after the slot of the first UWB session.

15. The method of claim 1, wherein:

a combination of at least two UWB sessions comprise a first UWB session and a second UWB session substantially aligned in time with the first UWB session;

transmission at the first carrier frequency occurs within a slot of a first round the first UWB session, the slot having a particular slot index; and transmission at the second carrier frequency occurs within a slot of a second round of the second UWB session, the slot having the particular slot index.

16. A device for enabling frequency stitching in either or both of ultra-wideband (UWB) ranging or sensing, the device comprising:

a transceiver;

a memory; and one or more processors communicatively coupled with the transceiver and the memory, wherein the one or more processors are configured to:

determine capabilities of a UWB initiator device and a UWB responder device related to at least one UWB session, wherein:

the capabilities comprise information indicative of a capability of each of the UWB initiator device and the UWB responder device for performing radio frequency (RF) retuning during the at least one UWB session, and the UWB responder device is configured to take measurements of UWB RF signals transmitted by the UWB initiator device during the at least one UWB session;

determine a gap duration based at least in part on the capability of each of the UWB initiator device and the UWB responder device for performing RF retuning during the at least one UWB session; and send a configuration, via the transceiver, to the UWB initiator device, the UWB responder device, or both, wherein the configuration is indicative of:

a first period of time in the at least one UWB session during which a first portion of the UWB RF signals is transmitted using a first carrier frequency, a gap following the first period of time and having a duration of at least the determined gap duration, and a second period of time in the at least one UWB session, following the gap, during which a second portion of the UWB RF signals is transmitted using a second carrier frequency.

17. The device of claim 16, wherein the one or more processors are configured to include, in the configuration, an indication of one or more additional periods of time in the at least one UWB session subsequent to the second period of time, in addition to the first period of time and the second period of time, during which a one or more respective additional portions of the UWB RF signals is transmitted, wherein:

each of the one or more additional periods of time is preceded by an additional gap having at least the determined gap duration, and each of the one or more respective additional portions of the UWB RF signals is transmitted using a different carrier frequency.

18. The device of claim 16, wherein, to determine a capability of each of the UWB initiator device and the UWB responder device for performing RF retuning during the at least one UWB session, the one or more processors are configured to determine:

an RF tuning resolution, a time required for performing the RF retuning, or both.

19. The device of claim 16, wherein the device comprises the UWB initiator device, and wherein:

to determine the capabilities of the UWB responder device, the one or more processors are configured to receive, via the transceiver, capability information via a control message from the UWB responder device, and the one or more processors are configured to send the configuration in a configuration message via the transceiver to the UWB responder device.

20. The device of claim 16, wherein the device comprises the UWB responder device, and wherein:

determine the capabilities of the UWB initiator device, the one or more processors are configured to receive, via the transceiver, capability information via a control message from the UWB initiator device, and the one or more processors are configured to send the configuration in a configuration message from the UWB responder device to the UWB initiator device.

21. The device of claim 16, wherein the device comprises a server communicatively coupled with the UWB responder device and the UWB initiator device.

22. The device of claim 16, wherein the one or more processors are configured to include, in the configuration, an indication that the first period of time, the gap, and the second period of time are each to be contained sequentially within a single slot of a single UWB session of the at least one UWB session.

23. The device of claim 16, wherein the one or more processors are configured to include, in the configuration, and indication that the first period of time is to occur within a first slot of a single UWB session of the at least one UWB session, and the second period of time is to occur in a second slot of the single UWB session immediately following the first slot.

24. The device of claim 23, wherein the one or more processors are configured to include, in the configuration, and indication that the gap is to occur during the first slot or during a Tx offset of the second slot.

25. The device of claim 16, wherein the one or more processors are configured to include, in the configuration, and indication that:

a combination of at least two UWB sessions comprise a first UWB session and at least a second UWB session following the first UWB session by a time offset;

transmission at the first carrier frequency is to occur within a slot of the first UWB session having a particular slot index;

transmission at the second carrier frequency is to occur within a slot of the second UWB session having the particular slot index;

transmissions at each of the next carrier frequencies are to occur within associated slots of the next UWB sessions having the particular slot index; and the duration of the time offsets between UWB sessions are such that the slot of the second UWB session is to occur after the slot of the first UWB session.

26. The device of claim 16, wherein the one or more processors are configured to include, in the configuration, and indication that:

a combination of at least two UWB sessions comprise a first UWB session and at least a second UWB session substantially aligned in time with the first UWB session;

transmission at the first carrier frequency is to occur within a slot of the first UWB session having a first slot index;

transmission at the second carrier frequency is to occur within a slot of the second UWB session having a second slot index different than the first slot index; and the second slot index is such that the slot of the second UWB session is to occur after the slot of the first UWB session.

27. The device of claim 16, wherein the one or more processors are configured to include, in the configuration, and indication that:

a combination of at least two UWB sessions comprise a first UWB session and a second UWB session substantially aligned in time with the first UWB session;

transmission at the first carrier frequency is to occur within a slot of a first round the first UWB session, the slot having a particular slot index; and transmission at the second carrier frequency is to occur within a slot of a second round of the second UWB session, the slot having the particular slot index.

28. An apparatus for enabling frequency stitching in either or both of ultra-wideband (UWB) ranging or sensing, the apparatus comprising:

means for determining capabilities of a UWB initiator device and a UWB responder device related to at least one UWB session, wherein:

the capabilities comprise information indicative of a capability of each of the UWB initiator device and the UWB responder device for performing radio frequency (RF) retuning during the at least one UWB session, and the UWB responder device is configured to take measurements of UWB RF signals transmitted by the UWB initiator device during the at least one UWB session;

means for determining a gap duration based at least in part on the capability of each of the UWB initiator device and the UWB responder device for performing RF retuning during the at least one UWB session; and means for sending a configuration to the UWB initiator device, the UWB responder device, or both, wherein the configuration is indicative of:

a first period of time in the at least one UWB session during which a first portion of the UWB RF signals is transmitted using a first carrier frequency, a gap following the first period of time and having a duration of at least the determined gap duration, and a second period of time in the at least one UWB session, following the gap, during which a second portion of the UWB RF signals is transmitted using a second carrier frequency.

29. The apparatus of claim 28, wherein the means for sending a configuration include means for including, in the configuration and indication of one or more additional periods of time in the at least one UWB session subsequent to the second period of time, in addition to the first period of time and the second period of time, during which a one or more respective additional portions of the UWB RF signals is transmitted, wherein:

each of the one or more additional periods of time is preceded by an additional gap having at least the determined gap duration, and each of the one or more respective additional portions of the UWB RF signals is transmitted using a different carrier frequency.

30. A non-transitory computer-readable medium storing instructions for enabling frequency stitching in either or both of ultra-wideband (UWB) ranging or sensing, the instructions comprising code for:

determining capabilities of a UWB initiator device and a UWB responder device related to at least one UWB session, wherein:

the capabilities comprise information indicative of a capability of each of the UWB initiator device and the UWB responder device for performing radio frequency (RF) retuning during the at least one UWB session, and the UWB responder device is configured to take measurements of UWB RF signals transmitted by the UWB initiator device during the at least one UWB session;

determining a gap duration based at least in part on the capability of each of the UWB initiator device and the UWB responder device for performing RF retuning during the at least one UWB session; and sending a configuration to the UWB initiator device, the UWB responder device, or both, wherein the configuration is indicative of:

a first period of time in the at least one UWB session during which a first portion of the UWB RF signals is transmitted using a first carrier frequency, a gap following the first period of time and having a duration of at least the determined gap duration, and a second period of time in the at least one UWB session, following the gap, during which a second portion of the UWB RF signals is transmitted using a second carrier frequency.

* * * * *